United States Patent
Sharma et al.

(10) Patent No.: US 11,127,105 B2
(45) Date of Patent: *Sep. 21, 2021

(54) SIGNAL PROCESSORS AND METHODS FOR ESTIMATING GEOMETRIC TRANSFORMATIONS OF IMAGES FOR DIGITAL DATA EXTRACTION

(71) Applicant: Digimarc Corporation, Beaverton, OR (US)

(72) Inventors: Ravi K. Sharma, Portland, OR (US); John D. Lord, West Linn, OR (US); Robert G. Lyons, Portland, OR (US); Osama M. Alattar, Tigard, OR (US); Jacob L. Boles, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 266 days.

This patent is subject to a terminal disclaimer.

(21) Appl. No.: 15/967,214

(22) Filed: Apr. 30, 2018

(65) Prior Publication Data

US 2018/0330464 A1    Nov. 15, 2018

Related U.S. Application Data

(63) Continuation of application No. 15/211,944, filed on Jul. 15, 2016, now Pat. No. 9,959,587.
(Continued)

(51) Int. Cl.
  *G06T 1/00* (2006.01)
  *G06K 9/62* (2006.01)
  *G06T 3/00* (2006.01)

(52) U.S. Cl.
  CPC .......... *G06T 1/0064* (2013.01); *G06K 9/6206* (2013.01); *G06T 3/0006* (2013.01);
(Continued)

(58) Field of Classification Search
None
See application file for complete search history.

(56) References Cited

U.S. PATENT DOCUMENTS 3,987,243 A    10/1976 Schwartz
5,949,055 A    9/1999 Fleet
(Continued)

FOREIGN PATENT DOCUMENTS

JP    H11355547 A    12/1999
JP    2002010067 A    1/2002
(Continued)

OTHER PUBLICATIONS

Machine Translation of P2002171395, cited in the International Search Report, dated Oct. 26, 2016, for PCT Application No. PCT/US2016/042635, PCT Publication No. WO2017011801. (14 pages).

(Continued)

*Primary Examiner* — Bernard Krasnic
(74) *Attorney, Agent, or Firm* — Digimarc Corporation

(57) ABSTRACT

Signal processing devices and methods obtain an estimate of a geometric transform of an image signal, use it to obtain a measure of signal confidence of a reference signal in a sub-block of the image signal, and weight message estimates based on the signal confidence. The geometric transform is used as an approximation of the geometric distortion of an image after digital data is encoded in it, and it is used to compensate for this distortion to facilitate extracting embedded digital messages from the image. Due to the errors in the approximation, the signal confidence metric is determined and used to weight message symbol estimates extracted from the image.

20 Claims, 21 Drawing Sheets

Related U.S. Application Data

(60) Provisional application No. 62/193,479, filed on Jul. 16, 2015, provisional application No. 62/199,710, filed on Jul. 31, 2015.

(52) U.S. Cl.
CPC .... *G06T 3/0056* (2013.01); *G06T 2201/0052* (2013.01); *G06T 2201/0065* (2013.01); *G06T 2201/0081* (2013.01)

(56) References Cited

U.S. PATENT DOCUMENTS

| | | | |
|---|---|---|---|
| 6,408,082 | B1 | 6/2002 | Rhoads |
| 6,671,386 | B1 | 12/2003 | Shimizu |
| 7,231,061 | B2 | 6/2007 | Bradley |
| 7,466,840 | B2 | 12/2008 | Rhoads |
| 8,750,560 | B2 | 6/2014 | Sharma |
| 8,867,860 | B2 | 10/2014 | Lyons |
| 9,182,778 | B2 | 11/2015 | Sharma |
| 9,836,807 | B2 | 12/2017 | Lyons |
| 9,959,587 | B2 * | 5/2018 | Sharma ............... G06K 9/6206 |
| 2002/0106104 | A1 | 8/2002 | Brunk |
| 2002/0172396 | A1 | 11/2002 | Stach |
| 2003/0072468 | A1 | 4/2003 | Brunk |
| 2003/0081810 | A1 | 5/2003 | Bradley |
| 2003/0133589 | A1 | 7/2003 | Deguillaume |
| 2004/0086197 | A1 | 5/2004 | Fletcher |
| 2004/0105569 | A1 | 6/2004 | Sharma |
| 2004/0250078 | A1 | 12/2004 | Stach |
| 2005/0111760 | A1 | 5/2005 | Lal |
| 2006/0087458 | A1 | 4/2006 | Rodigast |
| 2011/0044494 | A1 | 2/2011 | Bradley |
| 2015/0071565 | A1 | 3/2015 | Sharma |
| 2015/0106416 | A1 | 4/2015 | Lyons |
| 2016/0132986 | A1 | 5/2016 | Sharma |
| 2016/0188972 | A1 | 6/2016 | Lyons |

FOREIGN PATENT DOCUMENTS

| | | |
|---|---|---|
| JP | 2002171395 A | 6/2002 |
| JP | 2013544448 A | 12/2013 |

OTHER PUBLICATIONS

International Search Report and Written Opinion dated Oct. 26, 2016 for PCT Application No. PCT/US2016/042635, PCT Publication No. WO2017011801. (25 pages).

Fitzgibbon, A. W., Pilu, M and Fischer, R. B.: "Direct least squares fitting of ellipses", Department of Artificial Intelligence, The University of Edinburgh, Jan. 1996. (15 pages).

Holter, "The Optimal Weights of a Maximum Ratio Combiner using an Eigenfilter Approach", Norwegian University of Science and Technology Department of Telecommunications. 2002 (4 pages).

Macleod, 'Fast Nearly ML Estimation of the Parameters of Real or Complex Single Tones or Resolved Multiple Tones', IEEE Transactions on Signal Processing, vol. 46 No. 1, Jan. 1998. (8 pages).

Quinn, 'Estimating Frequency by Interpolation Using Fourier Coefficients,' May 1994 (5 pages).

Quinn, "Estimation of Frequency, Amplitude, and Phase from the DFT of a Time Series", IEEE Transactions on Signal Processing, vol. 45, No. 3, Mar. 1997. (4 pages).

Lohmann, 'Matched Filtering with Self-Luminous Objects', Mar. 1968, Applied Optics, vol. 7, issue 3, p. 561-563.

Pereira et al., 'Robust Template Matching for Affine Resistant Image Watermarks,' IEEE Trans. on Image Processing, vol. 9, No. 6, Jun. 2000, pp. 1123-1129.

O'Ruanaidh et al., 'Rotation, Scale and Translation Invariant Spread Spectrum Digital Image Watermarking,' Signal Processing 66, May 1, 1998, pp. 303-317.

O'Ruanaidh et al., "Phase Watermarking of Digital Images", Sep. 19, 1996, IEEE Int. Conf. on Image Processing, 1996. Proceedings, vol. 3, p. 239-242.

Lyons Robert G et al: Estimating synchronization signal phase, Visual Communications and Image PRocessing; Jan. 20, 2004, San Jose, vol. 9409, Mar. 4, 2015, pp. 94090P-94090P, XP060050912, DOI: 10.1117/12.2083390, ISBN: 978-1-62841-730-2.

Examination Report dated Aug. 10, 2020, for European Account No. 16825285.6.

English translation of the First Office Action dated Feb. 22, 2021, in Chinese Application No. 201680050581.7.

* cited by examiner

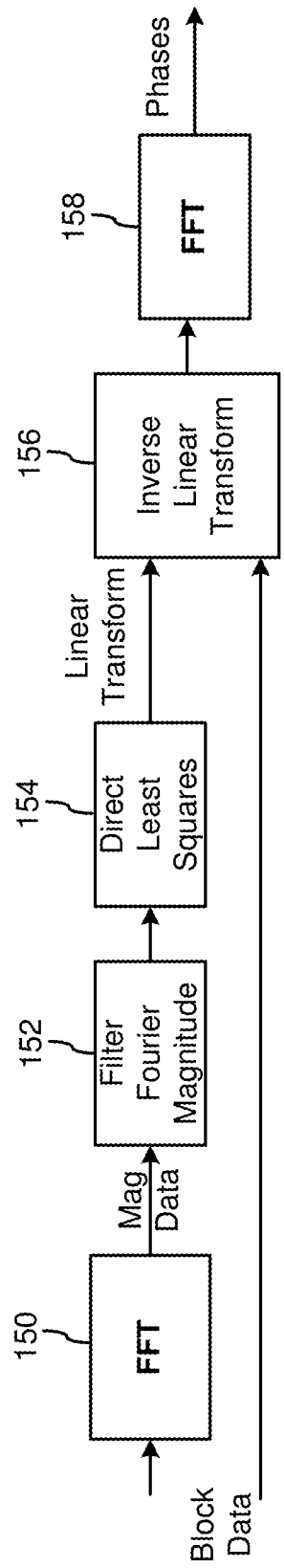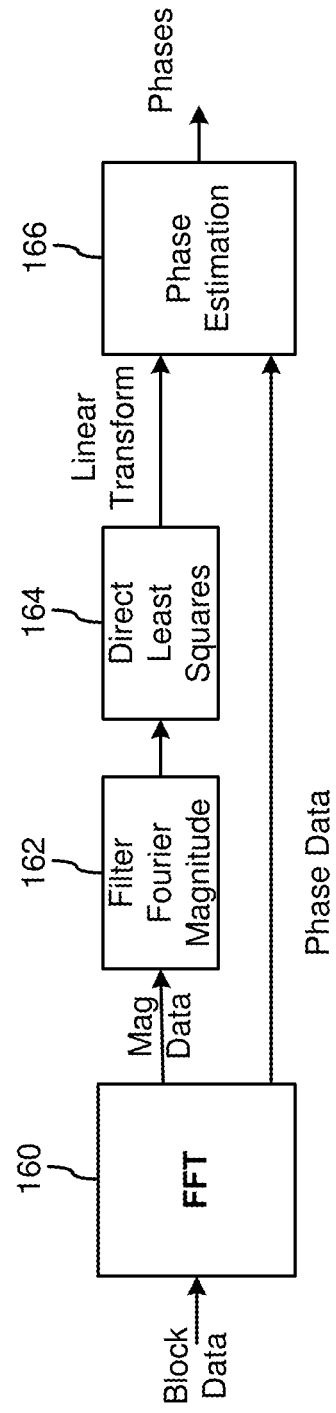
Fig. 5
Fig. 6

$$E_0[x_0, y_0] = \underbrace{\frac{1}{M} \sum_{i=1}^{M} \left\| \underbrace{e^{j(\theta_i' - \theta_i)}}_{} - \underbrace{e^{-j\frac{2\pi(u_i x_0 + v_i y_0)}{N}}}_{} \right\|^2}_{\text{Deviation between Measured Phase Difference and Expected Phase Difference at Frequency } (u_i, v_i) \text{ for translation offset } (x_0, y_0)}$$

2D Phase Deviation value at translation offset $(x_0, y_0)$ for zero-degree orientation Measured Phase Difference at Frequency $(u_i, v_i)$ Expected Phase Difference at Frequency $(u_i, v_i)$ for translation offset $(x_0, y_0)$ N = Support length of signal (e.g. 128)
M = Number of frequencies of interest (e.g. 64)
$x_0$ = horizontal translation offset ($x_0$ ranges from 0 to N-1)
$y_0$ = vertical translation offset ($y_0$ ranges from 0 to N-1)
$u_i$ = horizontal co-ordinate for the $i^{th}$ frequency of interest
$v_i$ = vertical co-ordinate for the $i^{th}$ frequency of interest
i = frequency index (i ranges from 1 to M)
$\|.\|^2$ = Euclidean distance measure
$E_0$ = 2D Phase Deviation surface for zero-degree orientation (for all values of $x_0$ and $y_0$)
$\theta_i$ = phase angle at frequency i for the reference signal
$\theta_i'$ = phase angle at frequency i for the suspect signal

Fig. 14

SIGNAL PROCESSORS AND METHODS FOR ESTIMATING GEOMETRIC TRANSFORMATIONS OF IMAGES FOR DIGITAL DATA EXTRACTION

RELATED APPLICATION DATA

This application is a continuation of U.S. application Ser. No. 15/211,944, filed Jul. 15, 2016 (now U.S. Pat. No. 9,959,587), which claims the benefit of US Provisional Application Nos. 62/193,479, filed Jul. 16, 2015, and 62/199,710, filed Jul. 31, 2015, which are hereby incorporated by reference. This application is also related to U.S. patent application Ser. No. 13/224,608, filed Sep. 2, 2011, which claims benefit of 61/380,180 filed Sep. 3, 2010.

TECHNICAL FIELD

The invention relates to signal processing, and specifically signal processing for determining transformations between signals, for use in signal detection, identification, signal matching and recognition applications, among others.

BACKGROUND AND SUMMARY

There are a wide variety of signal processing applications in which the affine transformation between a suspect signal and a reference signal need to be computed accurately and efficiently. This is particularly the case for signal detection and recognition applications for images, and it applies to other types of signals as well. In the case of signal detection and signal recognition, the objective for the computing device is to determine whether a particular reference signal is present in a suspect signal. This objective is more difficult when the reference signal is present, yet is distorted by a transform of the coordinate space. In image processing, such transformations are caused by manipulation of the reference signal through image editing (magnification, shrinking, rotation, digital sampling (and re-sampling), format conversions, etc.). When the reference images or the objects they represent are captured via a camera from a different reference point relative to their original state, the result is a suspect image, which contains the reference signal, yet in a transformed state. Unless there is a means to determine and compensate for the affine transformation of the reference signal, it is more difficult to accurately detect, recognize or match the reference signal with its counterpart in the suspect image.

This signal processing problem is important to a variety of fields. Some examples include machine vision, medical imagery analysis, object and signal recognition, biometric signal analysis and matching (e.g., facial, voice, iris/retinal, fingerprint matching), surveillance applications, etc. In these applications, the objective may be to detect or match an input suspect signal with one particular reference signal, or match it with many different reference signals (such as in database searching in which a query includes a suspect signal (a probe or template) that is matched against a reference database of signals). Various types of images and sounds can be identified using signal recognition and detection techniques. These include recognition based on signal attributes that are an inherent in signals, as well as recognition based on signals particularly embedded in another signal to provide an auxiliary data carrying capacity, as in the case of machine readable codes like bar codes and digital watermarks.

In recent years, computing devices are becoming increasingly equipped with sensors of various kinds, including image and audio sensors. To give these devices the ability to interact with the world around them, they need to be able to recognize and identify signals that they capture through the sensors.

The advances of electronics have extended these advanced sensory functions beyond special purpose devices like machine vision equipment, surveillance and exploration equipment, and medical imaging tools, to consumer electronics devices, like personal computers and mobile telephone handsets. The signals captured in these devices are often distorted by transformations. If these transformations can be approximated by affine transformations or at least locally affine transformations, then it may be possible to determine the affine transformation (including local affine transform in a portion of the signal) that most closely matches the suspect with a reference signal.

The affine transformation that aligns a reference signal with its counterpart in a suspect signal can be expressed as y=Ax+b, where x and y are vectors representing the reference and transformed version of the reference signal, A is a linear transform matrix, and b is translation. The affine transformation generally comprises a linear transformation (rotation, scaling or shear) and translation (i.e. shift). The linear transformation matrix, for two dimensional signals, is a two by two matrix (2×2) of parameters that define rotation, scale and shear. The translation component is a two by one (2×1) matrix of parameters that define the horizontal and vertical shift. The translation is related to the phase shift as described in more detail below. Thus, the process of aligning two signals can include both approximations of the linear transform as well as the translation. The linear transform is sometimes approximated by determining signal correlation operations, which often employ Fourier transforms and inverse Fourier transforms. The translation component is approximated by determining phase shift (e.g., using signal correlation) in a Fourier representation.

An example of a type of transform encountered in digital image capture is a perspective transform. This type of transform is typical when a user captures an image of an object with a camera of a mobile device because the plane of the camera is often tilted relative to an image on the object's surface. For example, the image on a box or document undergoes perspective distortion when captured with a camera that is tilted relative to the surface of the box or document. Of course, the object surface is not always planar, as it may be curved (e.g., bottles, cans, jars, etc.), and it may be flexible or deformable, in which case portions of the surface are flexed in various directions. Nevertheless, the object surface may be approximated as several patches of nearly planar surfaces stitched together. The geometric deformation of the image on a patch may be an affine or perspective transform.

To illustrate mathematically, the perspective transform of original coordinates (x, y) of an image to transformed coordinates (u, v, z) is represented by the following expression:

$$\begin{bmatrix} u \\ v \\ z \end{bmatrix} = \begin{bmatrix} A & B & C \\ D & E & F \\ G & H & 1 \end{bmatrix}$$

The transformed coordinates (u', v') of the distorted image may be expressed as:

$$u' = \frac{u}{z} = \frac{Ax + By + C}{Gx + Hy + 1}; v' = \frac{v}{z} = \frac{Dx + Ey + F}{Gx + Hy + 1}$$

The perspective transform has 8 unknown parameters. The linear transform parameters are A, B, D, and E in the above expression. Translation parameters are C and F, and trapezoidal parameters are G and H. These latter parameters, G and H, are also referred to as the perspective parameters.

FIG. 16 is a diagram illustrating the effect of a perspective transform. The task of mitigating the distortive effect of a perspective transform may be managed by sub-dividing the distorted image into blocks. If the distortion vector is small, and the image block of interest is also small, then the perspective transform may be approximated with affine transform parameters. The area enclosed by solid lines (400a) on the left side of FIG. 16 is a rectangular object covered by an image. The object (400a) is rectangular, yet through image capture with a camera at a slight tilt, it is distorted by a perspective transform, resulting in distorted image 400b on the right. The dashed lines illustrate the result of sub-dividing the image into blocks. For block 402, the perspective distortion is closely approximated by differential scale. For block 404, the perspective distortion is closely approximated by shear. The perspective distortion is more closely approximated by an affine transform as the image block size decreases. The trade-off, however, is that as the block size decreases, there is less image information available to ascertain the affine transform relative to the undistorted image. Digital image sampling and other sources of noise in the image capture process introduce further modifications of the image that complicate the design of image signal processing to recover and mitigate the impact of the perspective transform.

When signal transforms are computed in digital computing environments of general purpose processing units or special purpose digital logic circuits, a number of challenges arise. Some of these challenges include the errors caused by representing signals in discrete digital logic. Not only is quantization error introduced as analog signals are sampled through sensors, but also as these signals are re-sampled when transformed into different coordinate spaces (e.g., Fourier and inverse Fourier transforms). Additional errors are introduced in the precision or limits on precision of the circuitry used to store the discrete values of the signal and associated transform parameters. Another challenge is that signal recognition and signal alignment typically involves transforms and inverse transforms, which in addition to introducing errors, are computationally expensive to implement in hardware, require additional memory, and introduce memory bandwidth constraints as the need for read/write operations to memory increases as each value in the discrete signal is transformed, re-sampled, or approximated from neighboring sample values.

In view of these challenges, there is a need for methods to determine transforms between signals that are accurate, yet efficient to implement in digital computing environments. This includes more effective ways to estimate linear transforms as well as determining translation or phase shift.

This document details methods of computing a transformation between a discrete reference signal and an image signal using various techniques. One method provides a set of feature locations representing the discrete reference signal, and provides a seed set of initial transform parameters. The feature locations and transform parameters are represented as digital, electronic signals in an electronic memory. Using the seed set, the method finds geometric transform candidates that minimize error when the linear transforms are used to align the feature locations of the discrete reference signal and corresponding feature locations in the suspect signal. This includes computing a measure of correlation corresponding to the geometric transform candidates. The method evaluates the geometric transform candidates for each of the seeds to identify a subset of the candidates representing refined estimates of geometric transform candidates.

This document also describes various implementations of these methods. For example, one implementation is an electronic device implemented in digital logic components in an application specific integrated circuit. The device comprises a memory for storing a suspect signal representation. It includes a correlation module for receiving a seed set of geometric transform candidates and determining a correlation metric for each candidate as a measure of correlation between a reference signal and the suspect signal representation when the linear transform candidate is applied.

The device also includes a coordinate update module for determining feature locations within the suspect signal representation of a feature that corresponds to a feature of the reference signal at a location determined by applying the linear candidate transform. This module determines locations of components of a reference signal in the suspect signal and provides input to a geometric transform calculator to determine the transform between a reference signal and the suspect signal.

The device includes a geometric transform calculator for determining an updated linear transform for each of the candidates that provides a least squares fit between reference signal feature locations and the corresponding feature locations in the suspect signal determined by the coordinate update module. It uses correlation metrics to identify the most promising linear transform candidates. For example, it iterates through the process of updating the transform so long as the correlation metric shows signs of improvement in the transform's ability to align the reference and suspect signals.

Some embodiments employ a method of computing an estimate of phase of a transformed signal. This phase estimation method provides a set of feature locations representing a discrete reference signal, receives a suspect signal, and applies a transform to the reference signal to provide a set of transformed locations. It samples phase from the suspect signal at discrete sample locations in a neighborhood around the transformed locations. To these sampled phases, the method applies a point spread function to provide an estimate of phase of the suspect signal at locations corresponding to the transformed locations.

Phase estimation is implemented, for example, in a digital logic circuit comprising a memory for storing phase of a suspect signal and a transform module for transforming coordinates of a reference signal into transformed coordinate locations. The circuit also comprises a point spread function module for reading selected phase of the suspect signal from the memory at locations around a transformed coordinate location and applying a point spread function to the selected phase to provide an estimate phase.

Various embodiments employ phase estimation technology in the correlation metric and coordinate update process. For example, complex frequency components are estimated at non-integer locations employing a point spread function. These components enable more accurate measurement of correlation for a candidate geometric transform. Additionally, they enable more accurate location of coordinates for the coordinate update process.

Various embodiments apply the geometric transform to extract digital data from an image in which the reference signal is encoded. The geometric transform compensates for geometric distortion and allows for recovery of digital data message elements embedded at embedding locations. Some embodiments employ signal confidence metric based on the reference signal to weight message estimates extracted from the embedding locations.

Various embodiments employ techniques to speed the recovery of the geometric transform and reduce computational complexity of that process. One such technique employs a subset of the reference signal to identify geometric transform candidates for further refinement. Another technique, which may be employed alone, or in combination, winnows geometric transform candidates by their correlation metrics.

Some embodiments further employ a method of computing an estimate of a translation offset between a reference and suspect signal. This method operates on a set of phase estimates of a suspect signal. For each element in an array of translation offsets, the method provides a set of expected phases of the reference signal at the translation offset. It computes a phase deviation metric for each of the set of expected and corresponding phase estimates at the translation offset, and computes a sum of the phase deviation metrics at the translation offset. This approach provides a phase deviation surface corresponding to the array of translation offsets. The method determines a peak in the phase deviation metrics for the array of translation offsets (e.g., in the phase deviation surface), where a location of the peak provides the estimate of the translation offset.

This phase deviation method is implemented, for example, in a phase deviation circuit. The phase deviation circuit comprises a memory for storing a set of phase estimates of a suspect signal and known phases of a reference signal. It also comprises a phase deviation module for computing a phase deviation metric for each of the set of known phases of the reference signal and corresponding phase estimates from the reference signal for an array of translation offsets, and for computing a sum of the phase deviation metrics at the translation offsets. The circuit comprises a peak determination module for determining a peak in the phase deviation metrics for the array of translation offsets. The location of the peak provides the estimate of the translation offset between the reference and suspect signals.

The above-summarized methods are implemented in whole or in part as instructions (e.g., software or firmware for execution on one or more programmable processors), circuits, or a combination of circuits and instructions executed on programmable processors.

Further features will become apparent with reference to the following detailed description and accompanying drawings.

BRIEF DESCRIPTION OF THE DRAWINGS

FIG. 5 is a block diagram of a illustrating a method to compute estimates of the phases of a suspect signal for which an approximation of a linear transform has been computed.

FIG. 6 is a block diagram showing an alternative method to compute estimates of the phases of the suspect signal.

FIG. 14 is a diagram illustrating a phase deviation equation based on a deviation metric.

DETAILED DESCRIPTION

Figure 1:
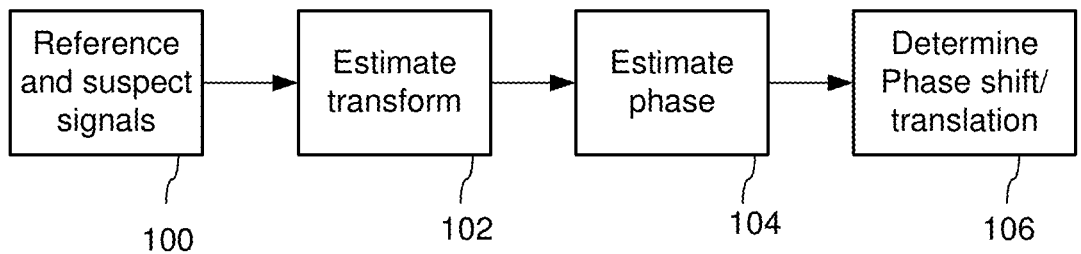
FIG. 1 is a block diagram illustrating an implementation of a process for determining a transformation between a reference and suspect signal.

FIG. 1 is a block diagram illustrating an implementation of a process for determining a transformation between a reference and suspect signal. We refer to this process as a transformation recovery process because it recovers a transformation of the reference signal from a suspect signal captured within a device. In particular, we have implemented this method to recover the transform required to align the suspect signal with the reference signal. The process takes as input a discrete representation of a known reference and the captured suspect signal 100 and determines an estimate of a transformation, which when applied to the reference signal, would approximate the suspect signal. The transformation recovery process is sub-divided into stages 102-106 in which the first stage provides an estimate of a transform (e.g., a linear transform described by 4-D vector of linear transform parameters (or 2 by 2 linear transform matrix)) and the subsequent stages refine the estimate by first estimating a phase of the reference signal as transformed by an estimated transform of stage 102 and then finding the phase and the translation in stage 106 (thus, providing two additional parameters of translation, e.g., horizontal and vertical shift parameters, x and y). The phase and translation are not necessarily separate, as they are related parameters, which may be used to provide the vertical and horizontal shift of the reference signal in the suspect signal. In our particular implementation, stage 102 provides candidate linear transforms, each corresponding to a 2 by 2 linear transform matrix. The next two stages provide two dimensional (2D) translation (in vertical and horizontal directions), which when combined with the 2 by 2 linear transform matrix, provide affine transform candidates. In this context, the phase shift and translation are related quantities that are expressed in different domains—the phase shift as a change in phase angle of signal components in a Frequency domain such as a Fourier transform domain, and translation in the spatial (e.g., the spatial domain of an image) or temporal domain (time domain of time varying signals like audio). Each of the stages 102-106 includes novel elements independent of the other stages, and we explain these novel elements in more detail. These stages are implemented in a system to compute an affine transform between signals and provide additional advantages when used in combination as explained further below. The methods and associated hardware implementations have application in a variety of signal detection and object recognition and matching applications. We illustrate examples of the methods in the context of digital watermark detection, but the methods are not limited to this context.

The methods also apply to a variety of signal types. They are designed to operate on two dimensional content signals captured from sensors (e.g., images or video frames captured with cameras). The methods also apply to one dimensional as well as 2 or more dimensional signals. One implementation, in particular, is adapted to determine the geometric transformation of a reference signal in image content. The reference signal is in the form of a two dimensional image watermark signal that is embedded in a host image. The reference signal can be generalized to encompass a variety of signal types for different applications. As such, the software and hardware implementations have applications in a variety of signal processing applications, such as object recognition, pattern recognition and matching, content fingerprinting, machine vision, and other applications where transformations between signals are computed. Our methods are particularly adapted for processing of signals captured in sensors, and in particular, image sensors like CCD and CMOS arrays, of the type used in digital scanners, cameras, mobile telephone handsets, etc.

Figure 2:
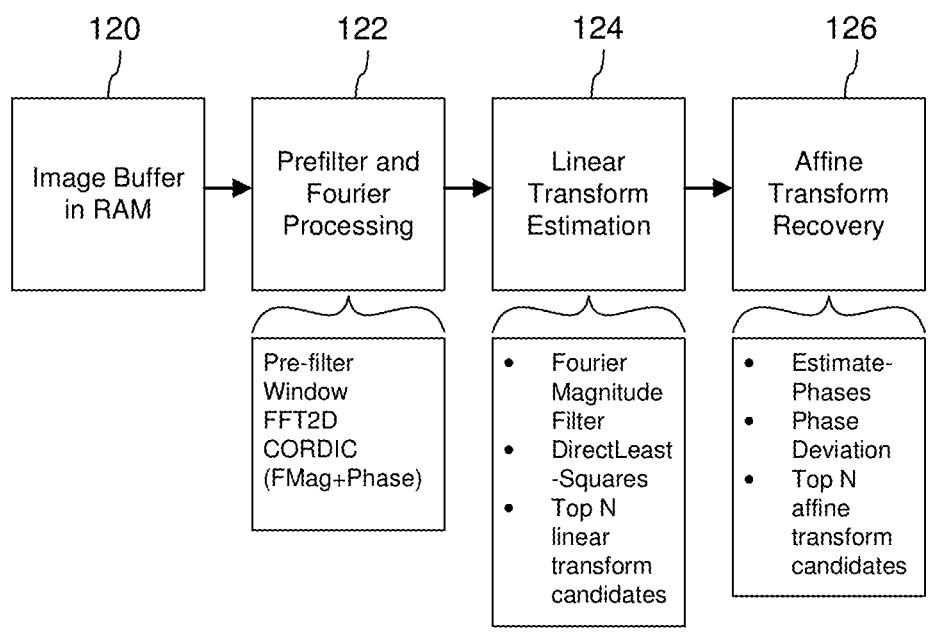
FIG. 2 is a diagram illustrating a hardware device that computes an affine transform between a reference and suspect signal.

As an example to provide context for the methods, we begin with an overview of watermark signal detection hardware. We then describe implementations of the individual stages. FIG. 2 is a diagram illustrating a hardware device that computes an affine transform between a reference and suspect signal. This particular design is adapted to recover the affine transform of an embedded two dimensional watermark signal. The design buffers portions of a captured and digitized electronic image in memory (RAM) 120 (the suspect image signal). A filter and Fourier transform processing module 122 filters the suspect image and computes a 2D Fourier transform. A linear transform estimation module 124 takes the discrete frequency representation of the suspect image and computes an estimate of a linear transform between a reference signal and the filtered suspect signal. Affine transform recovery module 126 uses the linear transform estimate, and reference and suspect signal representations to compute the phase/translation between the reference and suspect signal and so results in an affine transform which transforms the reference signal to the suspect signal.

The lower portion of FIG. 2 provides a break-down of sub-modules within modules 122-126. Implementations of these sub-modules are described further below.

The transform estimation of FIG. 1 can be implemented in a number of alternative ways. One approach is to perform a matched filter correlation between the reference and suspect signals. One such method for determining rotation and scale of a reference signal relative to a suspect signal is a Fourier-Mellin correlation. By converting both the suspect and reference signals to Fourier-Mellin coordinate space (a log polar coordinate space), the rotation and scale transform between the two signals is converted to translation shifts, enabling the application of matched filter correlation to find the location of a correlation peak, which corresponds to an estimate of the rotation and scale between the signals. Another is to perform a least squares method, and in particular, a direct least squares method. Below we describe implementations of least square methods. These are particularly useful for implementation in hardware, where the processing can be implemented in sequential pipelined hardware logic stages, and in software where the processing can be performed in parallel on hardware processing units such as, Graphics Processing Units (GPUs), Digital Signal Processors (DSPs) or multi core Central Processing Units (CPUs), to name a few ("processors").

Least Squares

Least Squares Technique

The least squares technique estimates a linear transform that yields the least square error (i.e., the maximum likelihood estimate), given an initial guess of the linear transform. Operations consist of multiplies and adds, and are hardware friendly.

Figure 3:
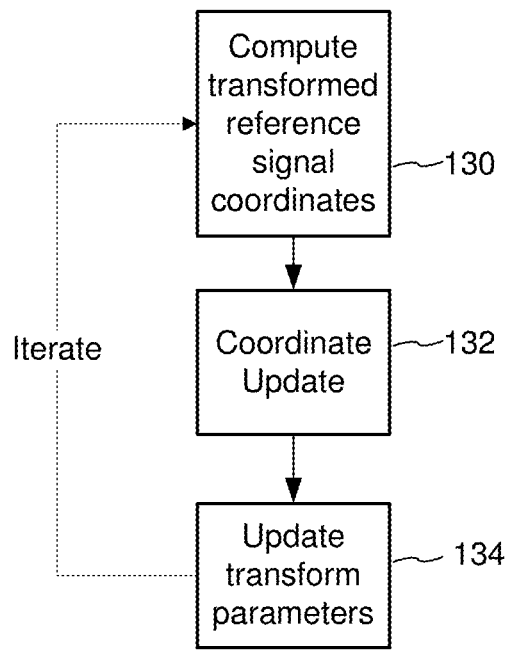
FIG. 3 is a flow diagram illustrating a least squares method that computes a best fit transform that aligns a reference signal with its counterpart in a suspect signal.

FIG. 3 is a flow diagram illustrating a least squares method. One implementation takes as input the coordinates for a set of reference locations (in either the frequency or spatial domain) and the corresponding set of coordinates for a set of transformed locations (again, either in the frequency or spatial domain). For the sake of illustration, we describe the technique for an implementation in which the reference locations correspond to features in the frequency domain, and in particular, peaks in the frequency domain.

This least squares method is performed iteratively and includes three steps for each iteration. These three steps are illustrated in FIG. 3 in processing blocks 130, 132, and 134:

Computation of transformed frequency coordinates 130—
In this stage, the transformed frequency coordinates are computed using the initial transform and the original (i.e., non-transformed) frequency coordinates of the signal.

Coordinate update 132—in this step, more suitable locations for each transformed frequency is sought by searching the frequency magnitude plane for the peak value around a small neighborhood of the transformed frequency. At the end of this step, the coordinate of each transformed frequency is updated if a more suitable peak location is found for this frequency. The optimal frequency coordinates computed in this process result in locations that can no longer be simultaneously determined by a single linear transform.

Transform update 134—in this step, an updated linear transform is calculated from the updated coordinates using the least squares formulation. This updated transform is used as an initial guess for the next iteration. The least squares technique provides the transform that minimizes the squared error between the original and transformed coordinates. In particular, it provides the transform that minimizes, in the sense of least squared error, the sum of the location errors. The computation of the new transform from the errors is implemented as follows:

A measure of correlation, called correlation strength, is computed for each iteration. The correlation strength metric can be used to determine early termination of iterations or to provide regularization.

In theory, the least squares technique can find the actual linear transform between a reference and suspect signal starting from any initial guess of the linear transform parameters. However, from a practical standpoint (to prevent the coordinate update from being overly complex), the initial guess of the linear transform parameters must be somewhat close to the actual linear transform. Consequently, the technique is sensitive to the initial guess.

The initial guess of the transform can be as simple as a rotation and scale pair.

This least squares method can determine any arbitrary linear transform (i.e., including rotation, scale, shear, and, differential scale).

Direct Least Squares (DLS)

DLS is an efficient application of the least squares technique to determine the linear transform between a suspect and a reference signal. Our particular implementation applies to images, and in particular, the suspect image is a watermarked image, and the reference signal is a watermark signal, which is assumed to be embedded in the watermarked image. The task, in this case, is to determine the linear transform between the original reference signal, which is known, and its counterpart which is assumed to be embedded in the suspect signal.

In DLS, the least squares technique is applied to a sparse set of initial guesses of the linear transform.

DLS requires fewer evaluations than a Fourier-Mellin type correlation, while providing a more accurate transform than Fourier-Mellin. As noted above, a correlation between reference and suspect signals in the Fourier-Mellin domain provides an estimate of rotation and scale. Least squares, in contrast, can provide any arbitrary linear transform (e.g., a 4D vector of linear transform parameters).

With DLS, the 4-dimensional space covered by the 2×2 linear transform matrix can be evaluated extremely efficiently with initial guesses spanning a sparse 2-dimensional subspace.

Each DLS evaluation uses the least squares technique, and is independent of other DLS evaluations on the 2D subspace. Therefore, DLS evaluations can be performed efficiently in hardware or on multi-core processor architectures. Each evaluation results in an estimated linear transform and a corresponding correlation strength value. Candidate linear transforms are identified as those transforms corresponding to the largest correlation strength values. One or more of these candidate linear transforms are processed further to recover the affine transform.

DLS allows the initial guesses to be arbitrarily spread around the 2D subspace. For example, if the initial guesses comprise rotation/scale pairs, the spacing along the rotation axis and the scale axis can be arbitrary. In comparison, the Fourier-Mellin approach requires the spacing in the scale axis to be logarithmic. The use of arbitrary spacing has two advantages—increased robustness and efficient computation. In the general case, the set of initial guesses are ideally selected such that they are uniformly distributed over a sparse subset of rotation and scale values. For example, a uniform spacing in the scale axis (uniform increments in scale) can be efficiently computed and also reduces noise artifacts. The ability of DLS to converge on the appropriate linear transform and the accuracy of the estimated transform is influenced by the number of initial guesses and the number of least squares iterations. Another influence is the scope of the search for reference signal components in the suspect signal (e.g., the size of the neighborhood that is searched for a reference signal component). Optimal values for these parameters are determined as a tradeoff between hardware cost, computational speed and desired robustness. A more sophisticated strategy consists of using a very sparse set of initial guesses in conjunction with an adaptive number of iterations. More iterations are performed for cases where the resulting transforms from successive iterations exhibit convergence. This strategy provides computational efficiency without sacrificing robustness.

In certain applications, the suspect signal may undergo a limited set of transformations. For example, the rotation may be restricted to a range between −30 and +30 degrees. In such situations, DLS evaluations are performed on a further restricted range of sparse initial guesses.

Due to noise and distortion, the linear transform estimated by DLS can be noisy. In our particular case, the transform is noisy when estimated from a single image block of an image with weak watermark signal. To reduce the noise in the estimated transform, we take advantage of characteristics of the DLS output. Recall that DLS results in an estimated linear transform and a correlation strength value for each initial guess. For a well-designed set of initial guesses, multiple initial guesses lead to similar linear transforms. In other words, the output linear transforms are clustered. To reduce noise in the linear transform estimate, clusters of linear transforms are identified, and their elements appropriately averaged. Appropriate averaging can be done by weighting each linear transform by some function (e.g. nonlinear function) of the correlation strength.

Figure 4:
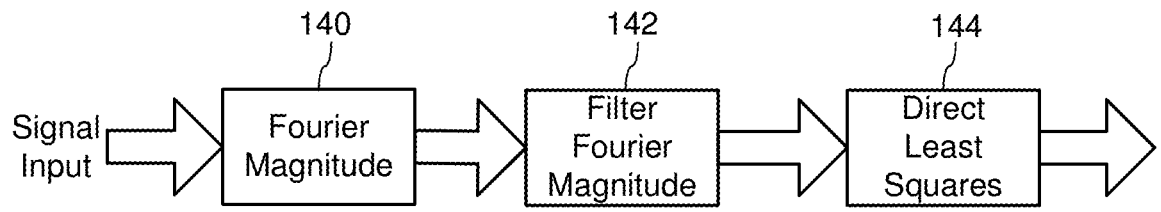
FIG. 4 is a block diagram of processing flow in a digital logic circuit implementation.

FIG. 4 is a block diagram of processing flow in a digital logic circuit implementation. A Fourier transform module 140 accesses the input signal (e.g., block of image data captured by an image sensor) from memory, and computes a Fourier transform and Fourier magnitude data. Fourier magnitude filter 142 filters the 2D Fourier magnitude data. One such filter is a non-linear filter that compares a sample value with each of its eight neighbors and replaces the sample value with an aggregate value based on these comparisons. In one implementation, the filter uses a ratio of the sample value to the average of its 8 neighbors (in the Fourier magnitude domain). The output of the filter is then a function (in this case, a nonlinear function) of this ratio. This filter is particularly useful in extracting reference signal features (e.g., in digital watermarking where the reference signal is embedded in the suspect signal). The output of the filter then forms the input to the direct least squares method. In another implementation, the filter output is a linear function of the ratio of the central value to the average of the 8 neighbors, which tends to improve robustness under low signal to noise ratio conditions.

Update Coordinates (Block 132 of FIG. 3)

The coordinate update process comprises a local search for a peak (or desired characteristic such as a corner or feature) around a small neighborhood surrounding the transformed location (frequency) of interest.

Neighborhoods are typically defined as a 3×3 or 2×2 region of samples or could be much larger depending on the problem domain and application.

If the peak or desired feature is in a different location than the transformed location, the coordinate of the transformed location is updated to this location The least squares method provides an estimate of the linear transform between the suspect and reference signals. To recover the complete affine transform, the phase shift (or the translation) between the two signals needs to be computed. One approach is to compute a phase correlation between a phase representation of both the reference and suspect signals, taking into account the linear transform. We have developed processing modules that are particularly advantageous in recovering the affine transform. These processing modules, as noted above in FIG. 1, are phase estimation and phase deviation.

Phase Estimation

Our phase estimation approach is advantageous because it calculates phases from the Fast Fourier Transform (FFT) of a transformed signal rather than performing the inverse transform of the image followed by an additional FFT to compute and extract the phases. Phase estimation uses the linear transform that the reference signal has undergone within the suspect signal. While direct least squares is illustrated as one method to compute this linear transform, there are other ways to compute it, such as using matched filters (e.g., the Fourier Mellin correlation to approximate the linear transform).

Highlighting this advantage, FIGS. 5 and 6 are block diagrams illustrating different methods of calculating phase information: one without phase estimation and the other with phase estimation. Both methods use direct least squares methods to estimate linear transforms between the signals. A first FFT is performed to obtain the magnitude information that the direct least squares technique operates on. The approach of FIG. 6 uses our phase estimation technique, while FIG. 5 performs an inverse linear transform followed by a second FFT to calculate the phases. Phase estimation avoids the extra processing of both the inverse linear transform and the second FFT.

Figure 7:
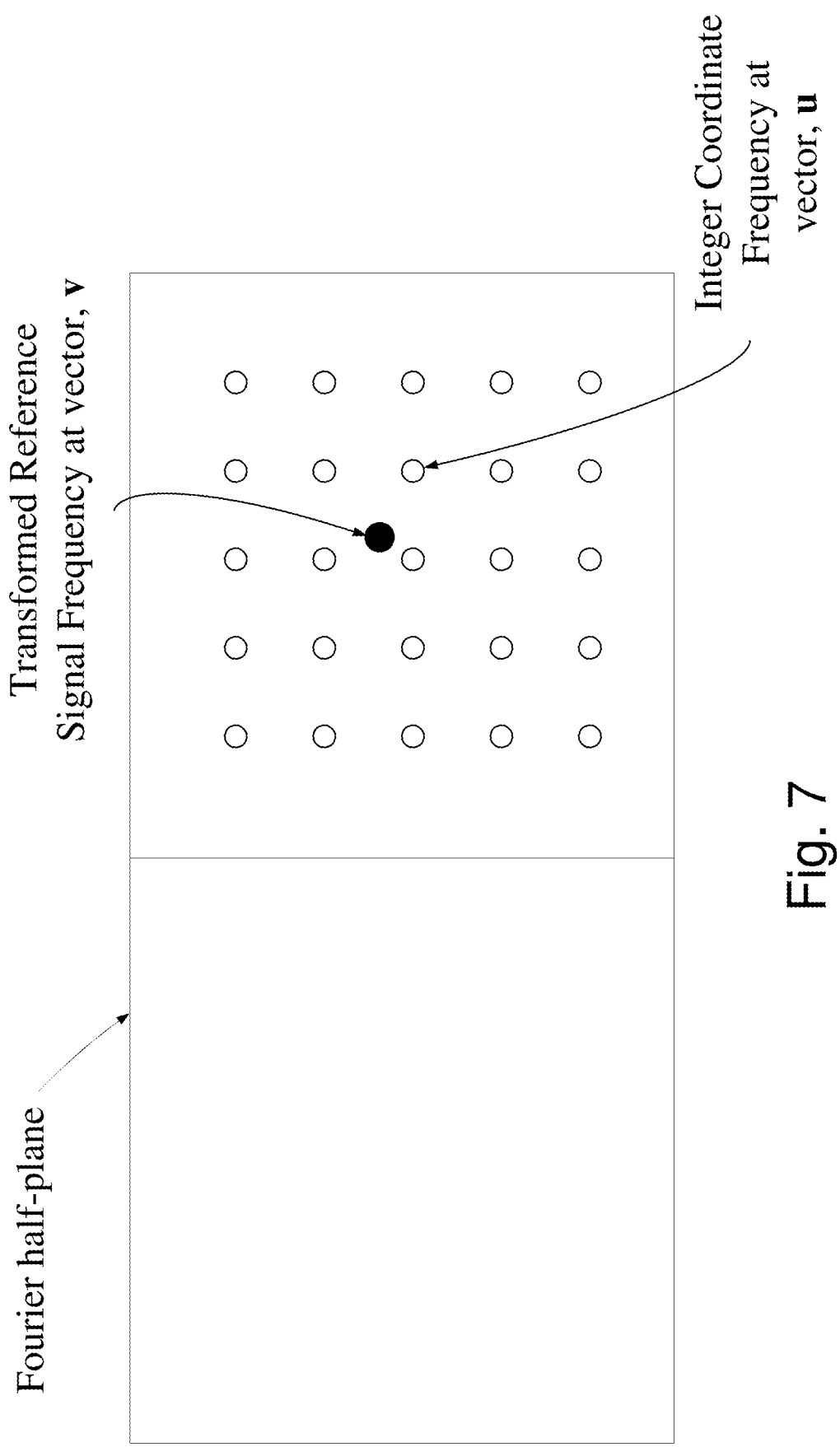
FIG. 7 is a diagram illustrating that the transformed frequency component of a discrete reference signal does not fall on integer coordinates in a Fourier domain, and as such, requires a phase estimation method to estimate phases from neighboring frequency locations.

FIG. 7 is a diagram illustrating the problem that phase estimation addresses. When the linear transform is applied to a reference signal coordinate, it likely does not map to a discrete coordinate. The phase estimation method provides an efficient approach to computing the phases at non-discrete (i.e., real valued) co-ordinate locations.

Figure 8:
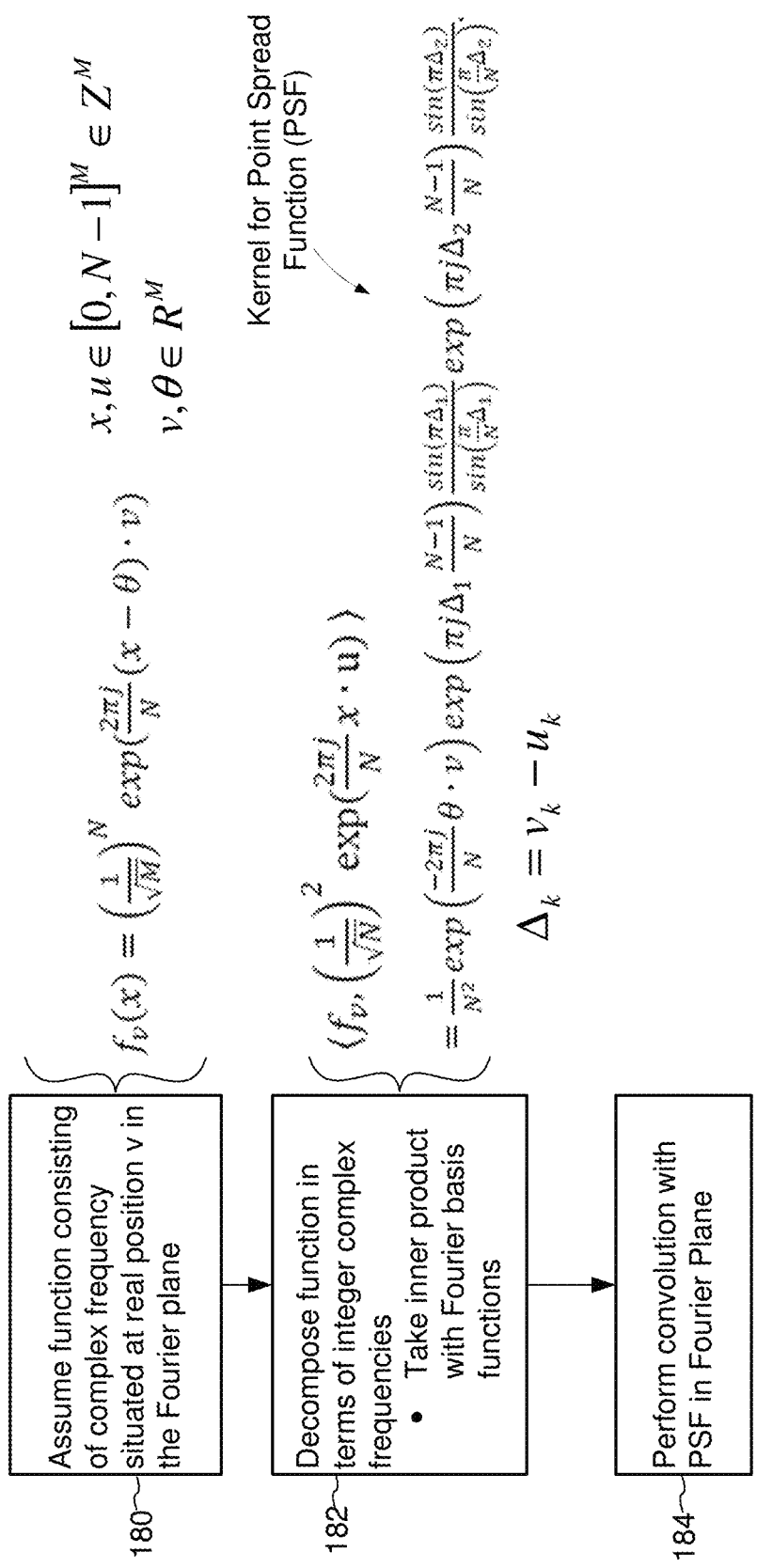
FIG. 8 is a diagram illustrating a process of deriving the phase estimation method and associated mathematics supporting the derivation.

To understand how phase estimation addresses the problem, we begin with a derivation of the phase estimation method. FIG. 8 is a diagram illustrating a process of deriving the phase estimation method and associated mathematics supporting the derivation. As illustrated in FIG. 7 and block 180 in FIG. 8, the first step in the derivation assumes a function consisting of complex frequency situated at real position v in the Fourier plane.

Block 182 of FIG. 8 and the corresponding mathematical expressions illustrate a derivation of a Point Spread Function (PSF) used for phase estimation. The PSF is derived by decomposing complex frequencies situated at real positions in the Fourier plane in terms of integer complex frequencies. This PSF is complex-valued.

As shown in block 184, the last step in the derivation performs a convolution with PSF in Fourier Plane. The inner product of block 182 of FIG. 8 is with respect to the Fourier basis functions—this provides the PSF. The PSF is then used in block 184 to convolve with the values in the Fourier plane.

Figure 9:
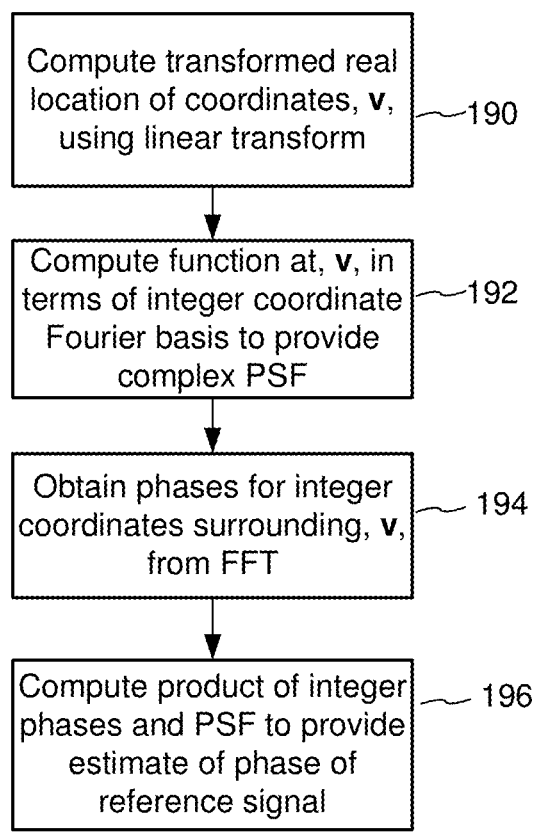
FIG. 9 is a flow diagram illustrating a phase estimation method to compute phases given a linear transform and a reference signal.

FIG. 9 is a flow diagram illustrating a phase estimation method to compute phases given a linear transform and a reference signal. There are two principal stages in our phase estimation process. In a first stage, the implementation transforms the known reference signal coordinates (in particular, a set of sinusoids at known frequency coordinates) according to a linear transform. In a second stage, the implementation uses the transformed coordinates and the phase information surrounding these coordinates in the suspect signal's frequency domain to obtain phase estimates of the transformed frequency coordinates. The inputs to this process are the discrete suspect signal, which is stored in memory in the form of a complex frequency plane from the 2D FFT, along with the assumed transform (e.g., the linear transform computed previously), and the reference signal's frequency specification (this is the set of known frequency locations of the sinusoids of the reference signal). For each real complex frequency, phase estimation applies the following steps a. Compute transformed real location (e.g., non-integral) of the frequency using the provided linear transform (block 190).

b. Express complex frequency at the real location in terms of integer-coordinate Fourier basis. This provides the complex PSF (block 192).

c. Obtain the phases for the integral frequencies surrounding the desired real frequency from the FFT of the suspect image block (block 194). The PSF is peaked at Delta=0, and so a non-integral peak shows up in a small neighborhood (as expected). In particular, the function (sin(pi Delta)/N sin(pi Delta/N)) has a peak at 0 (in the limit).

d. Compute the sum of products of the complex values at the integral frequencies with the corresponding complex values of the PSF (block 196). This gives the estimated phase at the real complex frequency.

The PSF values can be pre-computed and stored in a table for efficiency. In addition, the phases can also be quantized (to a few phase angles) for efficiency. The implementation of the first stage of phase estimation makes a transformation to move each frequency location of the reference signal to the appropriate "fractional" position between the discrete frequency samples. The characteristics of the transformed reference signal's phase are independent of the signal frequency. For each fractional frequency position, the PSF table contains pre-computed phase information for the nearest discrete frequency locations.

To simplify the computation, the implementation uses a limited resolution of the fractional frequency positions, between each integer frequency. The implementation uses this reduction in number of fractional frequency positions to further reduce the size of the PSF table. The PSF table contains pre-computed phase information only for each permitted fractional frequency position.

This PSF phase information is then re-used for all future estimations (in the 2nd stage of the process). In one particular implementation, the phase information is pre-computed and the values are stored in small discrete tables. The tables are the same for horizontal and vertical frequency directions, so the implementation accesses twice and combines the values to make the expected phase for a 2D frequency location.

Our phase estimation operations are efficient and hardware friendly. Besides eliminating the inverse transform and additional FFT, this approach does not require access to the suspect signal data (e.g., the input suspect image) as shown in the method of FIG. 5. Instead, it uses the frequency data of the suspect signal, which has already been computed, as shown in FIG. 6. Consequently, phase estimation lends itself to a pipelined architecture in hardware.

In general, the phase estimation technique can be used to perform rotations or other transformations in the complex frequency domain, without first resorting to the spatial domain data.

Figure 10:
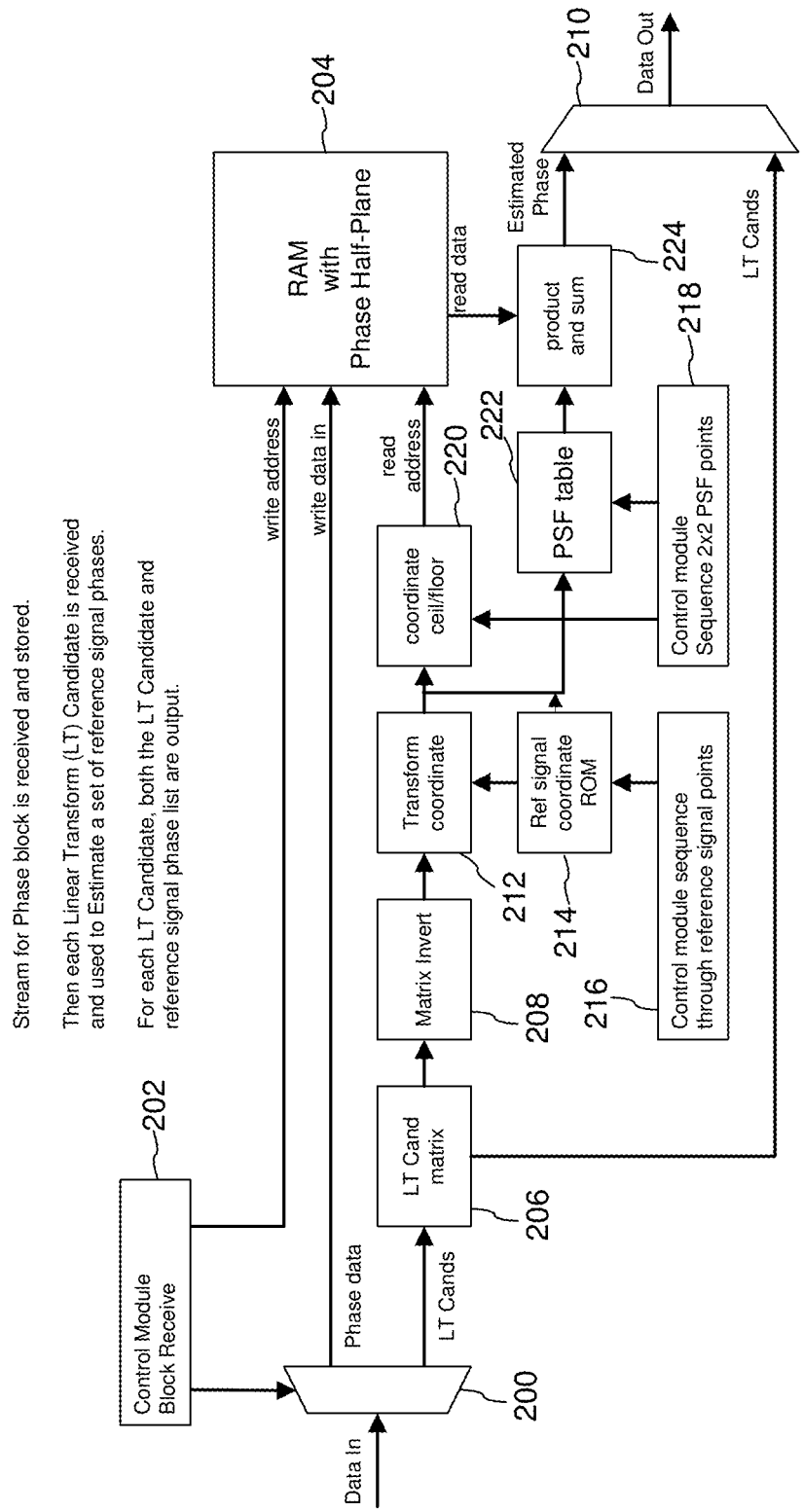
FIG. 10 is block diagram illustrating a digital logic circuit implementation of phase estimation.

FIG. 10 is a block diagram illustrating a digital logic circuit implementation of phase estimation. The phase estimation implementation shown in FIG. 10 receives a stream of phase information for a suspect signal block at data in module 200. Under control of control module 202, it stores the phase information (the phase half plane from a 2D FFT of the suspect signal block) in RAM memory 204. Linear transform candidates are also received through data in module 200 and stored directly in modules 206, 208 and 212 (alternatively, could be stored in RAM 204).

Linear transform candidate matrix module 206 forms the linear transform candidates in a matrix and provides them to a matrix invert module 208 and data out module 210. Matrix invert module 208 inverts the linear transform matrix. In this implementation, the linear transform is for a spatial transform of the image. For mapping the reference signal coordinates in the suspect image frequency domain, it takes the inverse transpose of the linear transform. Transform coordinate module 212 then takes a reference signal coordinate specifying the location of a reference signal component from a memory (Read Only Memory (ROM) 214) and transforms the location to a coordinate in the coordinate space of the suspect signal block. Control module 216 sequences through each of the locations of the reference signal components, providing the coordinates in the frequency domain. For each reference signal coordinate, control module 218 sequences through a 2 by 2 matrix of Point Spread Function (PSF) points. As it does so, it controls a coordinate ceiling/floor function module 220 that operates on the transformed coordinate of the reference signal component, and it selects the PSF for that coordinate in PSF table 222. The coordinate ceiling/floor module 220 then selects the neighboring frequency locations in the phase information RAM 204, which in turn, outputs the phase information at the neighboring locations to product and sum logic operators 224. The product and sum operators 224 apply the point spread function from table 222 to the phase information to calculate the estimated phase. Data out module 210 then outputs the estimated phases for each reference coordinate of the reference signal, along with the corresponding linear transform candidate. The phase estimation implementation cycles through all of the linear transform candidates, providing a set of estimated phases for each reference signal component for each LT candidate.

Phase Deviation

Referring back to FIG. 1, the process following phase estimation is to use this estimate of the phase of the transformed reference signal to determine the translation between the reference and suspect signals. There are alternative approaches to computing the translation at this point. One approach is to perform phase correlation between the phase representations of the transformed reference signal and the suspect signal (this requires an inverse FFT operation). Below, we describe an alternative approach referred to as phase deviation.

2D Phase Deviation

Phase deviation is an alternative approach to estimating the translation between two images or signals in general. As compared to a phase correlation approach, it does not require the inverse FFT operation.

Figure 11:
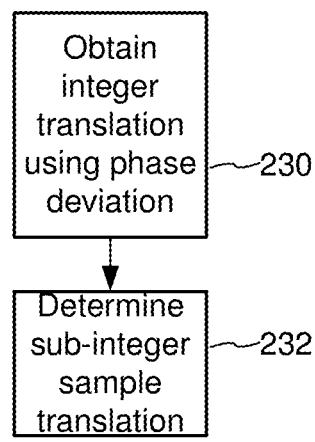
FIG. 11 is a flow diagram illustrating an overview of a phase deviation method.

FIG. 11 is a flow diagram illustrating an overview of a phase deviation method. The phase deviation method first obtains a set of candidate translation values (called the translation offsets) at a first level of detail (e.g., integer offsets) between the reference and suspect signals in step 230. In step 232 of FIG. 11, the phase deviation method refines these candidates by determining translation values that provide a better fit between the reference and suspect signals using a higher level of detail (e.g., fractional offsets) around the first set of candidate translations.

The phase deviation for a specified translation offset is the sum of deviations between the measured and the expected phases at all reference signal components of interest. In the case where the reference signal comprises a set of sinusoids, each with particular phase, the expected reference signal phases are the phases of the sinusoids at known translation offsets. These expected phases are provided for each of several translation offsets, which may be specified in terms of a phase angle or translation value (e.g., pixel offset at a particular image resolution). Stated another way, for each possible translation offset, there is a set of expected phases for the reference signal. Additionally, the other input is the measured phases, previously computed from the suspect signal. The deviation between the expected phases and the measured phases is computed for each translation offset. The deviation at each frequency can be calculated using a distance measure such as Euclidean distance between the measured and expected phases. The phase deviations calculated for all possible translation offsets constitute the 2D phase deviation surface. The location of the minimum value in the 2D phase deviation surface indicates the location of the translation offset.

A 2D phase deviation method can be implemented using just adds (no multiplies), and at a fraction of the computational cost of a 2D FFT. Also, the phase deviation calculations for each offset and for each frequency can be computed independently, leading to efficient parallel implementations. This is an advantage over alternative methods, like phase correlation.

The phase differences and deviations can either be computed as complex values or can be computed directly in terms of angles. Working with angles provides improved efficiencies in computation.

Distance measures other than the Euclidean distance can also be used. For example, the L1 norm or a nonlinear measure can provide improvements depending upon the specifics of the signals and noise involved.

In particular, the sum of deviations may be computed as the sum of absolute differences between the measured and expected phase angles, where each difference is wrapped between −pi and +pi, (modulo 2*pi). This computation is efficient to implement in hardware.

Sub-Sample Translation Estimation

Phase deviations can be computed for any arbitrary real valued translation offsets. This provides sub-sample translation estimation as opposed to integer valued translation estimation with the phase correlation approach.

The ability to compute a phase deviation metric at sub-sample translations can be used to implement a translation refinement technique where integer translations are first evaluated to determine suitable translation offsets around which further refinement is performed by evaluating sub-sample (i.e. fractional, sub-pixel for image content) translation offsets.

One Dimensional (1D) Phase Deviation

The basic phase deviation formulation can be modified to exploit patterns in the frequencies. Sets of frequencies for which the linear combination of coordinate values in one dimension (horizontal or vertical) is zero, lead to a 1D phase deviation formulation in the orthogonal dimension. Conceptually, this leads to hypothetical 1D signals in the orthogonal dimension which are a multiplication of the sets of 2D sinusoids in 2D space. The frequency of the hypothetical 1D signal is given by the sum of frequencies in the orthogonal dimension. Translation can then be estimated independently in each dimension using the 1D phase deviation formulation, for a fraction of the cost of 2D Phase Deviation. Besides, the search for a minimum phase deviation metric is along 1D (i.e. is on a one dimensional data set), further reducing the overall computational cost.

In some cases, the linear combinations lead to hypothetical 1D signals that are outside the support length (e.g. 128 points) of the original signal. These hypothetical 1D signals have a higher frequency than Nyquist. In this case, a 1D phase deviation method can be specified in terms of a larger artificial support length (e.g., using 256 points to ensure a higher sampling rate) to avoid aliasing. Avoiding aliasing increases reliability of translation estimation in noise.

1D phase deviation causes ambiguities in translation when all the resulting hypothetical frequencies in the orthogonal direction are even valued. For example, when pairs of quadrant symmetric frequencies of length 128×128 in 2D space (such as [−45, 9] and [45, 9], and, [−44, 6] and [44, 6]) are multiplied, the resulting 1D phase deviation has a periodicity of length 64. The frequency doubling caused by combining two frequencies of the same value leads to even valued 1D signal frequencies (e.g., 18 and 12), thereby introducing ambiguity. As a corollary to aliasing, mixing two frequencies A and B, produce new frequencies A+B and A−B. The ambiguity caused by periodicity can be resolved using 2D phase deviation for further evaluation of specific translations. Alternatively, the ambiguity can be avoided by ensuring that a substantial number (around half) of the hypothetical frequencies are odd valued.

A combination of 1D phase deviation and 2D phase deviation can be employed to take advantage of the meager computational load of 1D phase deviation and the robustness of 2D phase deviation.

Figure 12:
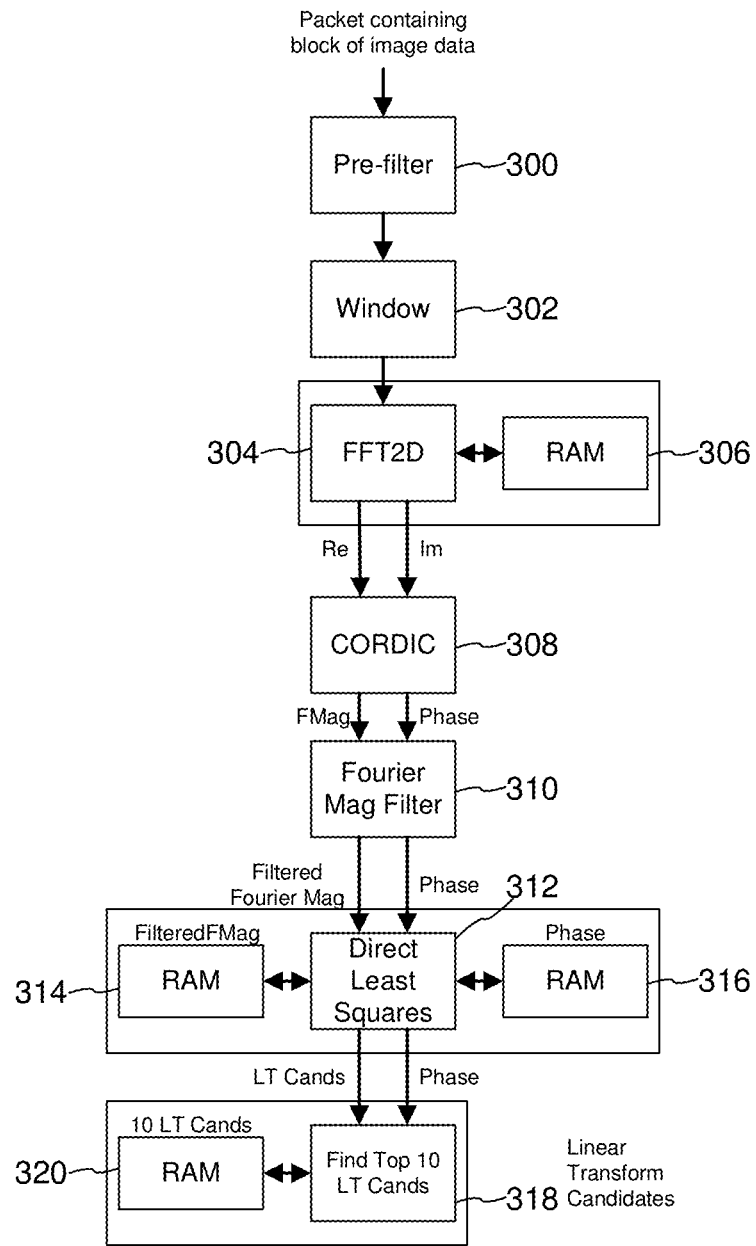
FIG. 12 is a block diagram of a digital logic circuit for estimating a linear transform.
Figure 13:
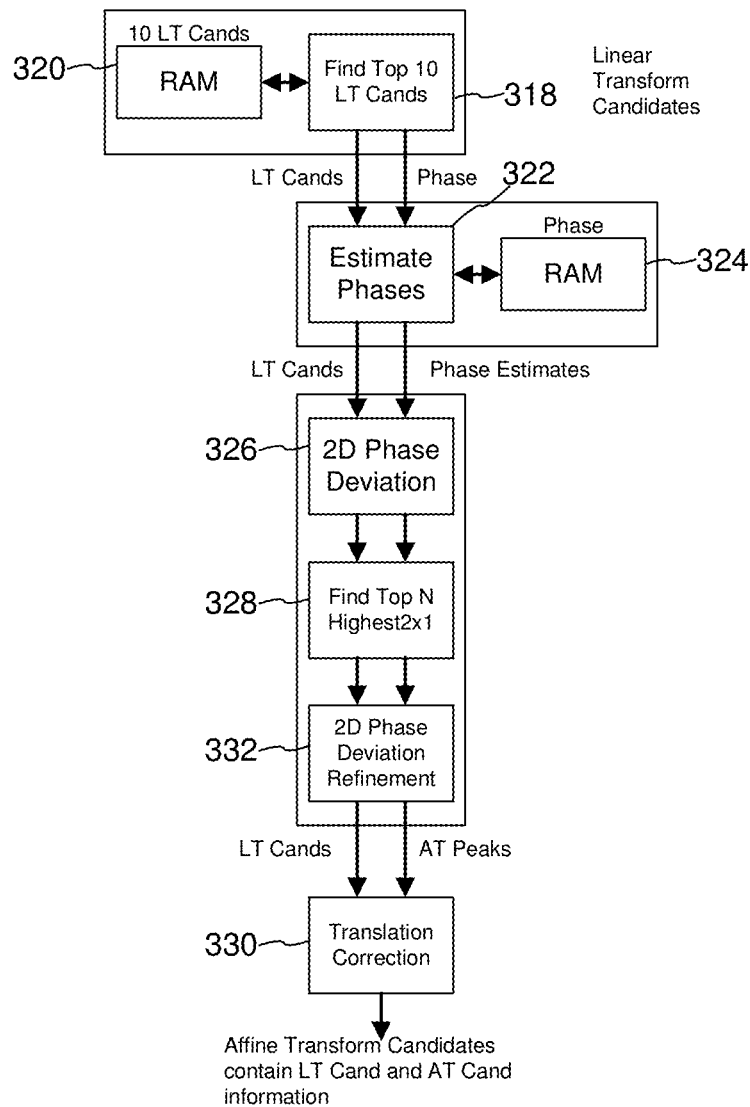
FIG. 13 is a block diagram of a digital logic circuit for phase estimation and phase deviation.

FIGS. 12 and 13 are block diagrams illustrating hardware implementations in more detail. FIG. 12 is a block diagram of a digital logic circuit for estimating a linear transform (e.g., block 102 in FIG. 1 and blocks 122-124 in FIG. 2). FIG. 13 is a block diagram of a digital logic circuit for phase estimation and phase deviation (e.g., blocks 102-104 in FIG. 1 and block 126 in FIG. 2).

As shown in FIG. 12, the input to the implementation is a packet of image data from the suspect image. The implementation computes the affine transform of a digital watermark signal embedded in the input image, which is the suspect image, relative to the initial coordinate space of the digital watermark, which is the reference signal. In this particular example, the reference signal is a set of frequency peaks corresponding to the watermark signal (namely, a set of sinusoids with a known, pseudorandom phase relative to each other). At this point in the process, the suspect image may have been subjected to various forms of distortion caused by sampling (scanning, printing, etc.) as well as geometric distortions (e.g., as a result of image editing and/or capture of the image in a transformed state from a scanner or camera). As a result of this distortion, the affine transform that best approximates the transformation between the known reference signal and its counterpart embedded in the suspect image is not known. The objective is to compute the affine transform that best approximates the transformation between the reference signal at the time of embedding, and the embedded reference signal within the suspect image.

Before describing the circuit implementation, it is helpful to provide background on the attributes of the reference and suspect signals because they dictate design considerations for the hardware. The digital watermark has been repeated within adjacent blocks (e.g., in a tiled fashion) of the signal. The digital hardware circuitry operates on a stream of input packets. The input packets comprise overlapping blocks of the suspect image that roughly correspond to the original size of the blocks into which the watermark was originally embedded. Each block is a 128 by 128 array of pixels. The size of memory and FFT filters etc. are adapted based on these signal attributes, and can vary with the application and signal specifications for those applications.

The pre-filter 300 filters the pixel values within the image block using the method described previously. Namely, each sample is compared with its eight neighbors and replaced by a value that is a function of these comparisons to provide a form of non-linear filtering that seeks to isolate the embedded reference signal from the suspect image data.

The window operation 302 prepares the filtered image data for a 2D FFT. The resulting filtered image data block is received by FFT2D (304) and stored in RAM. In this case, the RAM (306) is implemented within an ASIC along with the other hardware components shown in FIG. 12. FFT2D processes a block of spatial input data to produce complex frequency data. The Real and Imaginary parts of complex frequency data are interleaved in output into a single pipe output stream.

CORDIC 308 converts interleaved Real (Re) and Imaginary (Im) stream into interleaved magnitude and phase stream. As known in the field, CORDIC is a method for efficient digital signal processing implementation of trigonometric functions. A Fourier Magnitude Filter 310 filters only the Fourier Magnitude portion of the data. The filter uses a ratio of the sample value to the average of its 8 neighbors (in the Fourier magnitude domain). The output of the filter is then a function (in this case, a nonlinear function) of this ratio. The phase is passed through un-altered.

The Direct Least Squares (DLS) module 312 receives an interleaved stream of the Filtered Fourier Magnitude and Phase data. Each of these data streams is stored in a RAM, shown as RAM blocks 314 and 316.

DLS computes and refines each potential linear transform candidate for maximum correlation strength. The output of the DLS module 312 is a stream of linear transform (LT) candidates, preceded by the stored phase block. Phase data used for phase estimation is stored in a form that is ready to be sampled so that phases can be estimated for each candidate linear transform.

Block 318 sorts the input stream of linear transform candidates to find the top 10 candidates, based on a measure of correlation. This measure of correlation, in this implementation, is a correlation strength computed as the dot product between the reference and suspect signals after the linear transform candidate is used to align these signals. RAM 320 is a memory used to store the top linear transform candidates and corresponding correlation metrics.

FIG. 13 starts where FIG. 12 ends with the top linear transform candidates. The phase estimation module 322 receives the stream of phase data and stores it in RAM 324. It uses each of the linear transform candidates to estimate a set of phases for signal components in the suspect image corresponding to each of the frequency locations in the reference signal. For each linear transform candidate, the phase estimation module provides both the linear transform candidate and a set of phases corresponding to the frequency locations in the reference signal. These phases represent a measure of the phases of the reference signal component that is embedded in the suspect signal. In particular, for this implementation where the reference signal is embedded into the suspect signal as a digital watermark, the set of phases represent the estimates of the phases of the embedded reference signal components, which correspond to sinusoids with random phase. An embodiment of the phase estimation module may employ both phase and magnitude, over phase only. Phase only embodiments perform efficiently and provide satisfactory results.

In other implementations, the phase estimation module may be subsumed within the DLS module, since much of the matrix calculations to transform reference signal coordinates are already computed there, and the phase data is also readily available. This will result in the DLS module outputting both linear transforms and estimated phases for each of those transforms.

While the phase estimation method is depicted for a digital watermark detector implementation, the method is applicable to other applications where a signal processor seeks to find a known reference signal within a suspect signal. Examples include object recognition and pattern matching, where the signal processor seeks to find a known reference signal in an image. The phase estimation method enables the signal processor to compute estimates of the phase of a reference signal that is suspected to be a component of the suspect image. These phase estimates can then be used in additional matching or recognition operations to detect whether the reference signal is present in the suspect signal. In these methods, the same general approach is followed: the phase estimation uses an estimate of the transform between an expected signal pattern and corresponding components in a suspect signal, along with the phase of the suspect signal to compute estimates of the phase of the signal pattern in the suspect image.

Returning to FIG. 13, the phase deviation module 326 receives each linear transform candidate and a corresponding set of estimated phases of the reference signal in the suspect signal. The phase deviation module 326 computes a phase deviation surface for each linear transform candidate. This surface is an array of phase deviations, where each element in the array corresponds to a translation offset and the value of the element is sum of phase deviation metrics between corresponding expected and measured phase differences. For 2D phase deviation, this is a 2D array of phase deviation values corresponding to all pairs of translation offsets (e.g., a surface of 128 by 128 values). As described previously, the phase deviation for a particular translation offset is computed as a sum of a difference metric that calculates the deviation between an expected phase difference and the measured phase difference at a particular reference signal component. For our implementation, there are four orientations for each linear transform candidate, corresponding to orientations of 0, 90, 180 and 270 degrees. At the end of computing the phase deviation surface for an orientation, phase registers are re-oriented by 90 degrees.

The objective of the 2D phase deviation module is to provide one or more translation offset candidates corresponding to minima in phase deviation. Stated another way, the objective is to find the translation offset that best matches the expected and measured phase differences, as determined by the minimum deviation between the two. The implementation subtracts the phase deviation from a large constant to convert the problem of searching for minima to a problem of searching for peaks for convenience (in this case, a peak represents a minimum phase deviation metric in the phase deviation surface). Since the objective is to find the best matches between the expected and measured signals (i.e. the known reference signal and its counterpart in the suspect image), the hardware seeks to find peaks in the deviation between the two. The initial 2D phase deviation surface is computed for integer translation offsets for computational efficiency. However, the actual translation might lie at a fractional (i.e., sub-pixel) offset. As a result, peaks in the inverted phase deviation surface might be spread over a 2 by 1 pixel region (in either the horizontal or vertical direction). To overcome this effect, peaks are searched over 2×1 regions in the Highest2×1 module 328.

To overcome the effects of noise and distortion, the top N peak candidates are further evaluated using a refinement module 332.

The refinement module begins with the top N peaks (e.g., 2 by 1) peaks identified in the inverted 2D phase deviation surface (e.g., the greatest minimum in magnitude in the phase deviation surface). The value of N is determined as a tradeoff between computational efficiency and robustness and is typically between 2 and 10. Then, for each of these N peaks, it computes a refined phase deviation surface in a neighborhood around the translation offset corresponding to the peak. These refined phase deviations are computed for sub-pixel translation offsets. In particular, the expected phase differences are computed for each of the sub-pixel translations in a M by M array around the integer translation offset location of a peak. The value of M and the fractional (i.e., sub-pixel) increments in translation are determined based on the desired computational throughput and robustness. A typical value for M is 16, while a typical fractional increment is a quarter pixel. The sum of phase deviations is calculated to provide the sub-pixel phase deviation surface. If there is a sub-pixel offset with a higher peak, this sub-pixel offset is included in a list of the top peaks.

The output of the 2D phase deviation module is a linear transform candidate followed by a list of peak coordinates corresponding to minima in the phase deviation surface (including any surfaces computed in the refinement stage).

The translation correction module 330 corrects the translation offset computed for each of the linear transform candidates. The nature of the correction is specific to the implementation and depends on implementation details such as, whether the reference signal phases used as inputs are expressed relative to Fourier representation block center or block corner, and Fourier processing and representation relative to block center or corner, as well as differences in the translation depending whether it is represented relative to the coordinate system of the transformed suspect signal or the reference signal.

FIG. 14 is a diagram illustrating a phase deviation equation based on a deviation metric. This diagram provides an example of a phase deviation metric. This metric is one example illustrating how to compute phase deviation values in the phase deviation surface. As shown in FIG. 14, phase deviation represents the deviation between a measured phase difference and expected phase difference for a particular frequency component, i, of the reference signal. The measured phase difference is the difference between the phase angle at frequency component, i, for the estimated phase of the reference signal in the suspect signal (e.g., as determined by the phase estimation process) and the known phase angle of the reference signal component. As noted previously, the phase estimation process provides a phase angle estimate for the suspect signal in the transformed state. In the implementation, the phase angle used for the known reference signal is in its original, un-transformed state.

The expected phase difference is directly computed from the horizontal and vertical translation offsets. As noted, these offsets start out as integer offsets, and then are sub-integer (e.g., sub-pixel) for refinement.

Note that in the equation that there are M frequency components in the reference signal. The deviation metric is a sum of the individual deviations for each of the frequency components. While the Euclidian distance measure is shown, other deviation metrics may be used as previously indicated.

From the depiction in FIG. 14, one can see that the 2D case shown can be reduced to 2 separate instances of 1D phase deviation by using a reference signal that has pairs of frequency components that are symmetric about the vertical axis, and thus, the horizontal components cancel each other, and likewise, have pairs of frequency components that are symmetric about the horizontal axis, and thus, the vertical components cancel each other. As noted, this enables the vertical and horizontal translation offsets to be determined separately in independent searches for the peak in the respective 1D phase deviation arrays.

Figure 15:
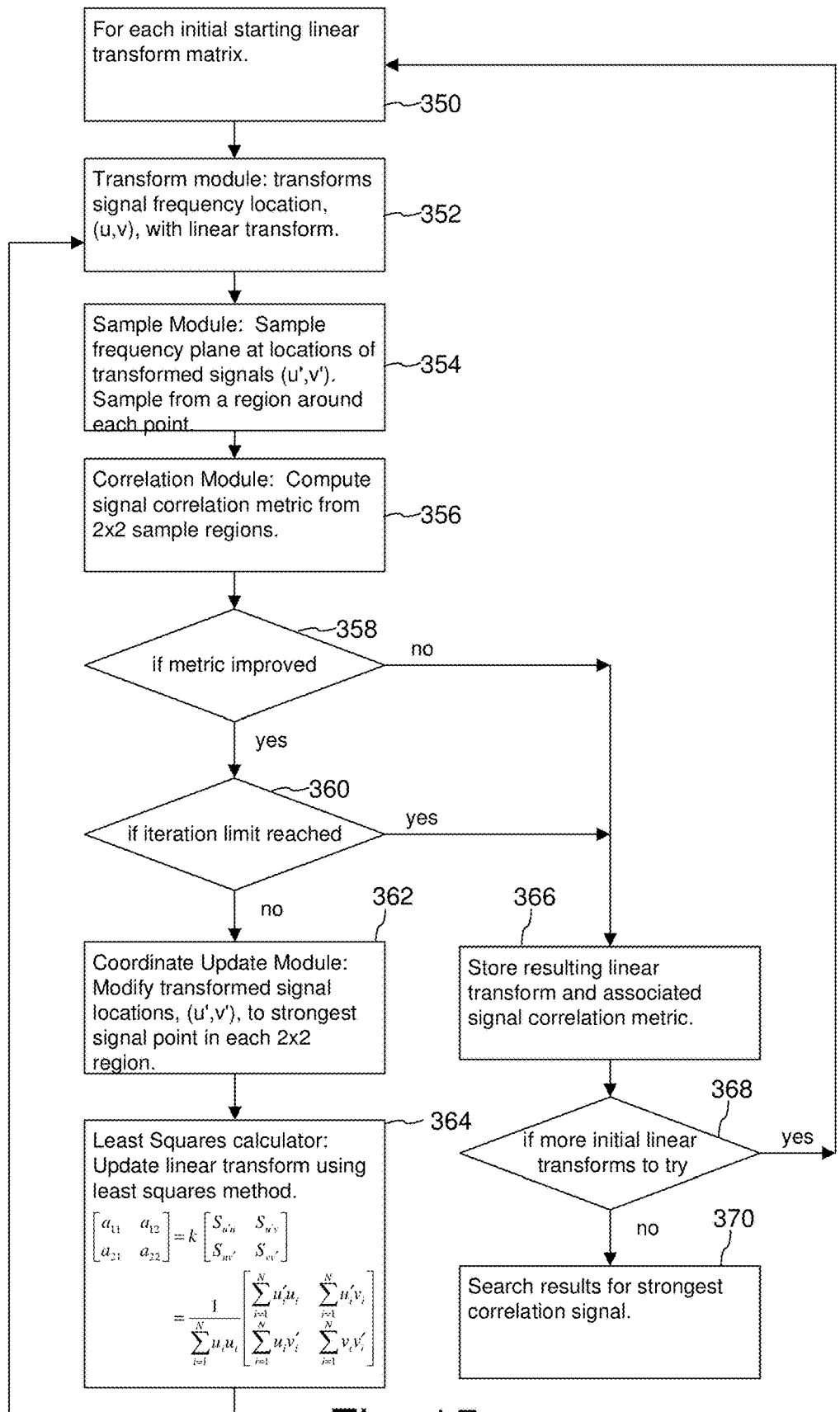
FIG. 15 is a diagram illustrating an implementation of a direct least squares method.
Figure 16:
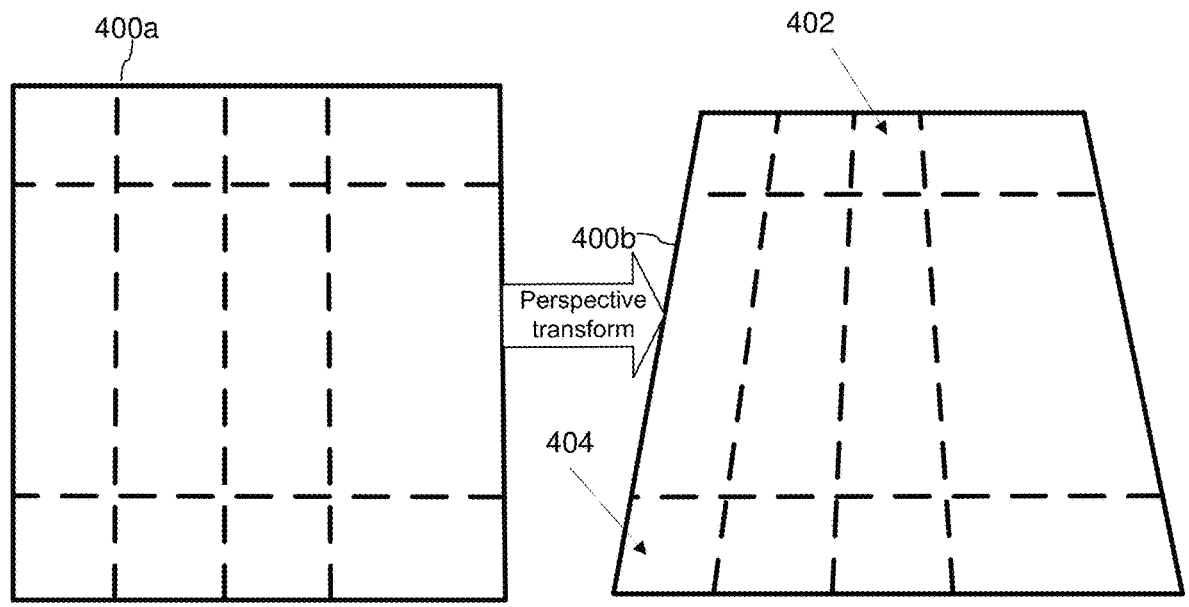
FIG. 16 is a diagram illustrating the effect of a perspective transform on an image.

FIG. 15 is a diagram illustrating an implementation of a DLS method. This is an implementation of the processing within, for example, block 312, in FIG. 12. As noted previously, the DLS module begins with a set of seed linear transform candidates in block 350. For example, this implementation begins with a sparse set of rotation-scale candidates (as noted in one example above), which comprise subset of the linear transform parameters represented in a 2 by 2 linear transform matrix. The other linear transform parameters represented in a 2 by 2 matrix include differential scale (e.g., horizontal and vertical scales) and shear (e.g., horizontal and vertical shear). When the DLS method starts with rotation and scale candidates, the other parameters are initially assumed to not provide any additional transformation, and subsequent iterations of the method update the linear transform in a manner that enables the other linear transform parameters to vary so as to provide a better fit between the reference and suspect signal. In other implementations, a different subset or formulation of sparse linear transform candidates may be chosen as seed candidates.

For each linear transform candidate in the starting set of seed candidates, a transform module in the DLS module transforms the frequency locations of the frequency components in the reference signal (352). A sample module then samples the frequency plane of the suspect signal at locations in a neighborhood around the location of each transformed location (354). The neighborhood is a region surrounding the transformed frequency location, and in practice it encompasses some number of discrete frequency locations in the FFT of the suspect signal. Next, a correlation module in the DLS module computes a signal correlation metric (356) that provides a measure of correlation between the reference signal and the suspect signal for these regions in the suspect signal around each transformed component of the reference signal. At the end of this process, the DLS module has a signal correlation metric for the linear transform candidate. It determines whether this metric is improved relative to a previously stored metric for a prior iteration (358). The DLS module continues so long as there is improvement in the correlation metric (358) and an iteration limit is not met (360).

There are a variety of ways to compute regions and the signal correlation metric computed for those regions. In one implementation in which the DLS module samples from the four nearest neighbor locations, the signal correlation metric is computed as a sum of the bi-linear interpolation of the frequency magnitudes at those neighbors for each transformed location within the suspect signal. Alternatives include computing correlation using a bi-cubic interpolation, and using a 3 by 3 sample region around each transformed frequency component's location. The correlation can also incorporate a correlation of the phase components of the suspect signals at the regions. In this case, the phases in the suspect signal are estimated using the phase estimation method.

In the case where the DLS module finds a linear transform candidate that improves upon the signal correlation and is below the iteration limit, the DLS module proceeds to establish a set of inputs to a least squares calculator, which in turn, computes a new candidate linear transform. This set of inputs comprises a set of frequency component locations corresponding to each transformed frequency component location, where there is a maximum in frequency magnitude. The process of finding these new locations for each component of the reference signal is reflected in block 362. In particular, a coordinate update module computes feature coordinates (e.g., peaks) in a neighborhood around the transformed coordinate locations. Next, the least squares calculator (364) computes a new linear transform candidate by using the least squares method to find a linear transform that best maps the reference signal components from their original locations to the new locations found in block 362.

The process depicted in block 362 is an implementation of "Coordinate Update" discussed above. One approach to updating the coordinates of a frequency component of the reference signal is to select the coordinates of the neighboring frequency location with the maximum magnitude in a neighboring region, such as a 2 by 2, 3 by 3, 5 by 5, etc. sample region around the transformed frequency location. This process does not require interpolation to find new coordinates. In some implementations, we have found that a 3 by 3 neighborhood covers differential scale up to 2-3% and sometimes up to 5%. There is a trade-off between using a larger neighborhood and potential confusion due to noise of adjacent frequency components of the reference signal. Our implementations use a reference signal where M is in the range of 35-75, the suspect image is sampled around a resolution of 100 dots per inch (DPI), and the block size and FFT size is 128 by 128 samples. The neighborhood sizes and shapes can be tailored for the unique characteristics of the reference signal. Neighborhood sizes can increase with increasing frequency. The neighborhood size and shape can be tailored to avoid conflict of noise due to adjacent frequency components in the reference signal. The neighborhood size and shape can also be adapted as a function of the linear transform candidate (e.g., transformed by the LT candidate). The update to the coordinate of a transformed location can also be computed as combination of neighboring values, such as by finding the center of a neighboring peak (e.g., a Normalized Center of Mass), a Center of Mass, a quadratic fit, or other interpolation of neighboring values. Phase estimates obtained from the suspect signal through phase estimation may also be used to find the frequency location with the maximum magnitude, as explained further in this document.

The least squares calculator of block 364 implements the expression shown in the diagram to solve for the 2 by 2 linear equation on the left hand side of the expression. This is implemented in hardware using multiply and add logic circuitry, and of course, can be implemented in software (including firmware instructions). As shown, the inputs are the coordinates of the reference signal components and the corresponding updated coordinates for the reference signal in the suspect signal as determined from the previous block (362).

After computing the update of the linear transform candidate in block 364, the DLS modules adds this linear transform as a new candidate and returns to block 352.

When the DLS module completes as determined in decision blocks 358-360, the resulting linear transform candidate and its associated signal correlation metric are stored for further processing (366). The DLS module repeats for additional seed linear transform candidates as shown in block 368. When the initial candidates have been processed and refined as shown, the DLS module has a refined linear transform candidate for each initial seed candidate. It searches this set of refined linear transform candidates for the strongest correlation. A subset of the top candidates based on correlation can then be used in further processing as noted. Also, as noted previously, linear transform candidates can be clustered and combined to form new linear transform candidates.

To mitigate the effect of a perspective transform, the seeds are expanded to include additional candidates in shear and differential scale directions. For example, in one embodiment, the seeds are comprised of pairs of rotation and scale parameter candidates, along with an additional number, N, of differential scale and shear parameters around each rotation and scale candidate pair. While we have found that using N of 4 and 8 provides effective perspective mitigation in our embodiments, N may vary depending on the needs of the application.

Figure 17:
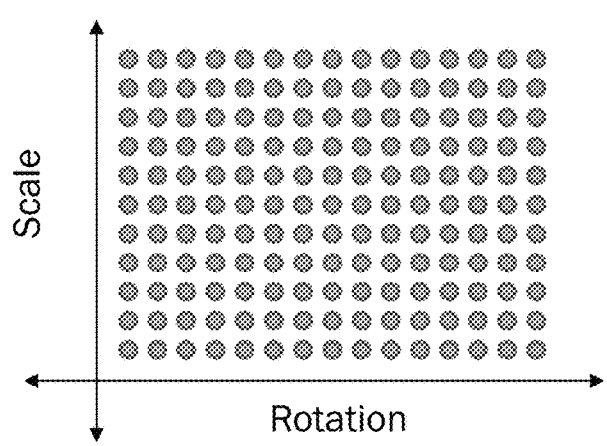
FIG. 17 illustrates an example of the rotation and scale parameter candidates, selected within a coordinate space of scale and rotation angle parameters.

FIG. 17 illustrates an example of the rotation and scale parameter candidates, selected within a coordinate space of scale and rotation angle parameters. The scale and rotation angle parameters cover a 2-dimensional surface in a 4-dimensional space of 2×2 matrices of affine transforms. The example of FIG. 17 shows uniform spacing of scale and rotation parameters; however, the spacing may be non-uniform and/or adaptively determined during execution of the method of recovering the affine transform. For example, the rotation and scale parameter seed candidates may be selected based on executing a classifier on the suspect image. The classifier is trained to select seed candidates based on image characteristics.

For the case of uniform spacing, the rotation and scale parameter seed candidates are spaced apart by uniform steps. The rotation angle candidates are spaced apart by a step size of about 1 to 2 degrees over a desired range of possible rotation angles, e.g., 0 to 90 degrees. The scale parameter candidates range from a lower limit of scale e.g., around ¼ the original image size to some desired upper limit, e.g., around twice the image size, or greater. These limits may be adjusted based on desired operating range and performance requirements.

Figure 18:
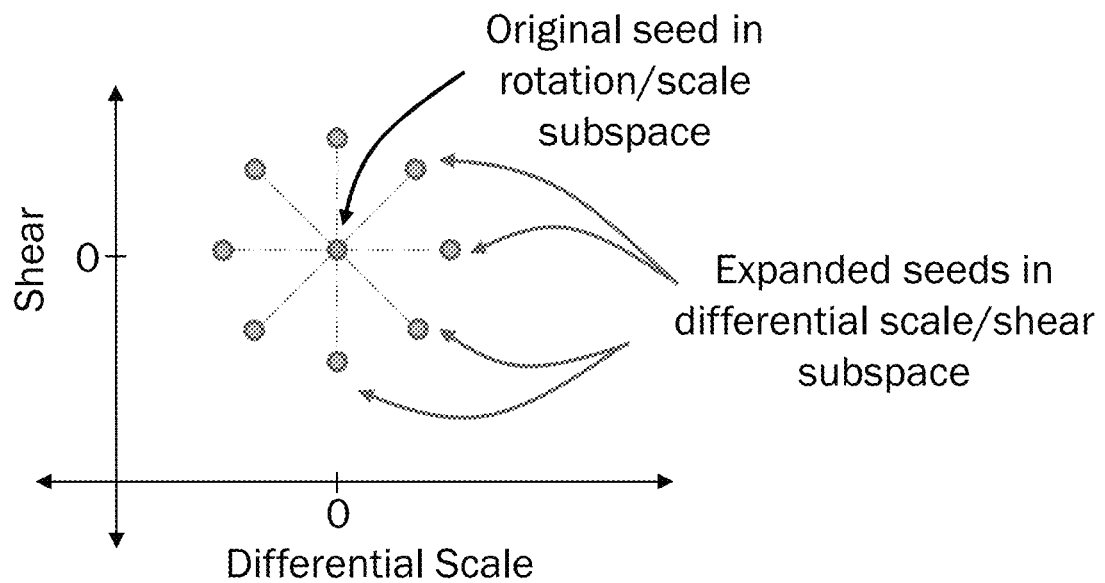
FIG. 18 is a diagram depicting a method of expanding a transform candidate in additional dimensions of an N dimensional transform parameter space.

FIG. 18 is a diagram depicting a method of expanding a transform candidate in additional dimensions of an N dimensional transform parameter space. In this example, the 2-dimensional surface of rotation/scale pairs is expanded by including 8 additional parameters of differential scale and shear for each original seed in rotation/scale subspace.

Figure 19:
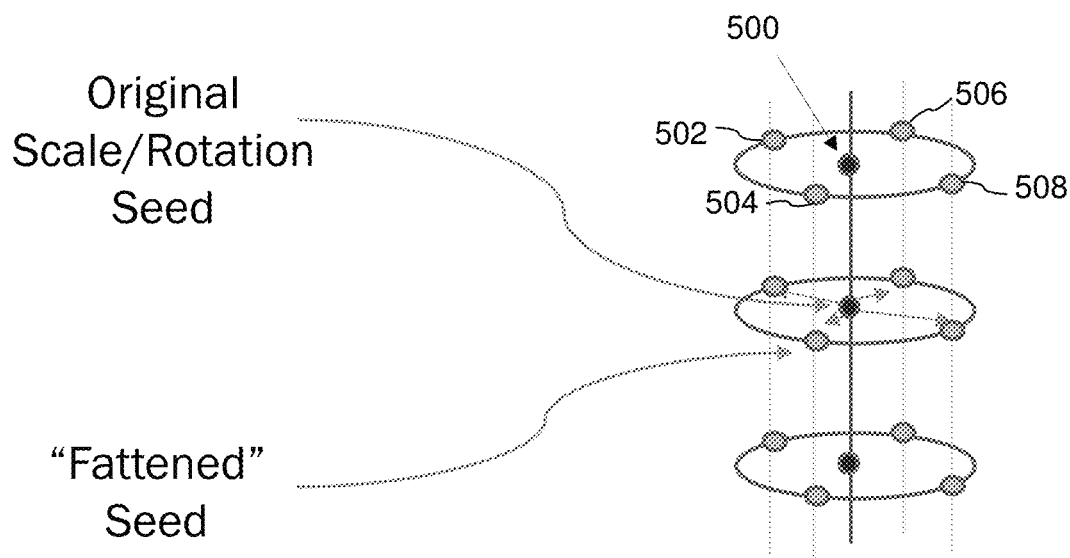
FIG. 19 is a diagram showing another example of expanding a transform candidate in directions in the parameter space around each candidate.

In this approach, eight additional seeds are generated by multiplying each original seed of rotation and scale by combinations of differential scale and shear, as shown in the following example:
 [1.00, 0.00; 0.00, 1.00]: Original Seed
 [1.03, 0.00; 0.00, 0.97]: Diff Scale
 [0.97, 0.00; 0.00, 1.03]: Diff Scale
 [1.00, 0.03; 0.03, 1.00]: Shear
 [1.00, −0.03; −0.03, 1.00]: Shear
 [1.02, 0.02; 0.02, 0.98]: Diff Scale+Shear
 [1.02, −0.02; −0.02, 0.98]: Diff Scale+Shear
 [0.98, 0.02; 0.02, 1.02]: Diff Scale+Shear
 [0.98, −0.02; −0.02, 1.02]: Diff Scale+Shear FIG. 19 is a diagram showing another example of expanding a transform candidate in directions in the parameter space around each candidate. The original seeds (e.g., rotation and scale pairs) (500) are shown as discrete points along a vertical axis. The seeds are called "fattened" seeds because they have been expanded to include 4 additional seeds each by expanding the original seeds in four directions 502, 504, 506 and 508 (in differential scale and shear directions around the original seed).

In one particular embodiment, the method of determining the affine transform iterates 3 or more times, each time executing the following operations for each seed:
 Find locations of transformed reference signal points by applying the linear transform specified by seed or updated seed (e.g., block 352, FIG. 15);
 Find updated peak locations in neighborhood of transformed reference signal points (e.g., block 362, FIG. 15);
 Find least squares linear transform that maps original reference signal points to these updated locations (e.g., block 364, FIG. 15);
 Compute correlation for this linear transform (e.g., block 356, FIG. 15);
 Exit if correlation decreases compared to previous iteration (e.g., signal processing path through blocks 358, 360, 366, 368 and 370 of FIG. 15).

The execution of these operations may be optimized to be faster by lowering the computational complexity of the operations. This lowered complexity leads to greater speed and less complexity of the hardware logic circuitry, firmware or software used to implement the operations. One optimization is to compute correlation for all seeds (e.g., according to blocks 352, 354 and 356), without seeking to refine the transform parameters using the coordinate update module 362 or least squares calculator 364. Then, the seeds with the N (e.g., N=100) highest correlation values are found and selected as input to a subsequent processing stage in which plural iterations (e.g., 3 or more) of refinement are performed on each of these N seeds. In the refinement stage, the processing of blocks 362 and 364 is used to update coordinates of transformed reference signal locations and then apply the least squares process to find updated transform parameters that transform the reference signal to these updated coordinates. In the iterations, processing of blocks 352-356 determines whether the correlation metric obtained for the updated transform parameters improve correlation over the previous iteration. This optimization reduces processing as the refinement stage is not executed for all seeds.

In another variant of this optimization, only a subset of the reference signal is used to identify the seeds with the N highest correlation. For example, where the reference signal is comprised of M peaks in the frequency domain, a subset of less than ½ M of the lowest frequency peaks is used in the first stage of finding the seeds with highest correlation. The choice of the number of subset frequency peaks used depends on the specific application and constraints. In the refinement stage, all M peaks are used.

In another variation, a least squares error metric is used to evaluate geometric transform candidates and remove candidates that are not likely to provide an effective geometric transform for extracting digital data. This error metric comprises a sum of location errors between transformed reference signal components and corresponding peaks in the image, as identified by the coordinate update process. Forms of this error metric include the sum of least squares error, sum of least squares residuals, sum of squared error, or the like. To determine which geometric candidates to eliminate from refinement stages, the least squares error metric is computed for each of several geometric transform candidates. The metric computed for each candidate is compared with a threshold. Those candidates with error metric exceeding the threshold are eliminated. The threshold is determined in a training process using images with encoded data. The error metric of candidates that lead to a successful decode after refinement stages, and error metric of those that do not, are plotted in a histogram, and a threshold is selected from the histogram that will retain viable geometric transform candidates, and exclude the rest, avoiding additional processing. This approach of avoiding unnecessary processing allows a very large number of geometric transform candidates to be evaluated, including candidates with extensive coverage of geometric transform parameter space comprising rotation, scale, differential scale and shear parameters. For more on this approach, please see U.S. Provisional Application No. 62/332,470, filed May 5, 2016, entitled Compensating for Geometric Distortion of Images in Constrained Processing Environments, which is hereby incorporated by reference.

In another variation, a spreading function is used for the correlation calculation. When the reference signal is comprised of reference signal peaks, correlation may be computed by performing a point-wise correlation between reference signal peaks and the suspect image. Using a spreading function, each reference signal peak is "spread" in the frequency domain to account for the effects of perspective.

In another variant, the correlation metric and coordinate update are adapted to include phase. This use of phase may be implemented efficiently using phase characteristics obtained from the development of the above phase estimation method. Phase estimation techniques provide an efficient way to estimate phase information from neighboring frequency components of the suspect image when the transformed coordinate of a reference signal component falls on non-integer coordinates. As detailed above, these estimation techniques provide an estimate for the full complex frequency component at fractional coordinates (i.e. non-integer coordinates). This estimate includes both phase and magnitude, which may be expressed as real and imaginary components at each fractional coordinate. In these variants, complex frequency components (comprising phase and magnitude) are exploited in the correlation and coordinate update modules.

While the specific translation of the reference signal may not be known at this point in the processing flow (it is determined in a subsequent process such as phase deviation), the phase estimation provides estimates of the full complex values of the reference signal components, and these estimates provide phase characteristics that may be used to improve correlation metrics and other aspects of the process of determining the geometric transform of the reference signal in the suspect image (prior to translation). The complex valued information gathered in this way provides an efficient means to compare phase characteristics of the suspect image sampled at the neighboring integer coordinates with the expected phase characteristics of the reference signal. Further, these techniques advantageously exploit complex frequency components (real and imaginary components) of each frequency component as explained further below to provide a more accurate detection of the reference signal and derivation of its geometric transform.

In variants of the above embodiments, complex frequency component information, including phase, is used advantageously within the correlation metric (e.g., 356 of FIG. 15) and coordinate update module (e.g., 362 of FIG. 15). In these embodiments, the reference signal is comprised of peaks in the frequency domain (e.g., sinusoids). As a result of various forms of signal distortion, the peak tends to smear over coordinates in the frequency domain of the suspect image. One example is geometric distortion due to a perspective transform of the suspect image. Other examples are quantization and sampling errors in the digital image signal processing (discrete sampling, window functions, DFT implementation with FFTs, etc.). This distortion introduces error into the correlation and coordinate update processes, as it makes it more challenging to assess whether a smeared peak corresponds to an actual reference signal peak or noise/host image interference.

As detailed above, a preliminary operation of correlation and coordinate update processing is to transform coordinates of a reference signal component (e.g., a peak or sinusoid) into coordinates of a frequency domain transform of the suspect image. Usually, these coordinates fall on a non-integer location. The correlation processes measure evidence of the reference signal in the suspect image around this location to assess the merits of an estimate of the geometric transform. If the merits are insufficient (e.g., correlation is below a threshold), the coordinate update process seeks to detect new coordinate locations of reference signal components in the suspect image and use them to refine the geometric transform.

Within these processes, estimates of complex frequency components (including phase) are used to more reliably assess whether a smeared peak at a fractional position corresponds to an actual reference signal peak. Before detailing examples of the correlation and coordinate update implementations, we begin with an illustration of phase characteristics.

Figure 26:
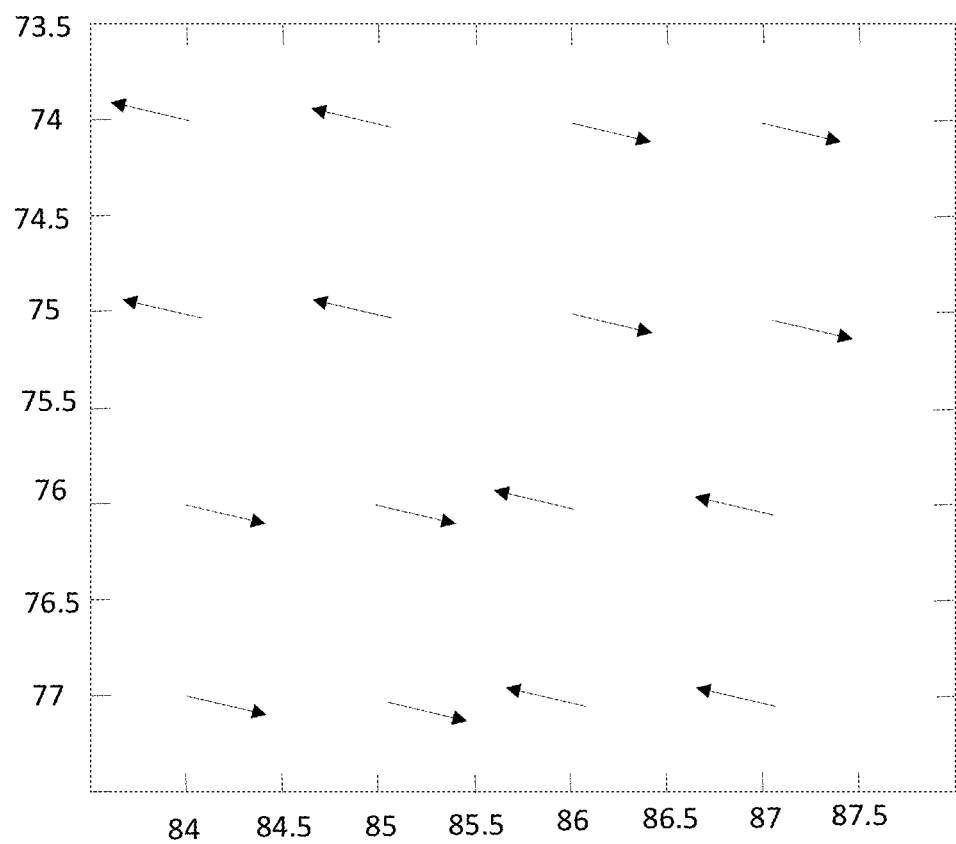
FIG. 26 is a diagram illustrating phase at integer coordinates of a pure sinusoid reference signal component located at non-integer coordinates.

The principles underlying the phase estimation process reveal the effect of moving a pure sinusoid reference signal component to a non-integer location. FIG. 26 is a diagram illustrating phase at integer coordinates of a pure sinusoid reference signal component located at non-integer coordinates. In this example, the reference signal component is a sinusoid at frequency coordinates (85.4, 75.7). The arrows within each cell at integer coordinates depict the phase angle of the reference signal component. As this example shows, the phases at neighboring integer coordinates have a relationship in which the phase angle at the nearest integer neighbor to the upper right (86, 75) of the reference signal component coordinates is in the same direction as the phase angle at the nearest lower left integer coordinates (85, 76).

The phase angle at the nearest integer neighbor to the upper left (85, 75) is in the same direction as the phase angle at the nearest neighbor to the lower right (86, 76). Extending further away from the non-integer coordinates (85.4, 75.7) of the sinusoid, the phase relationships are maintained. Namely, the phases sampled at integer coordinates in the upper right quadrant agree with the phases sampled at integer coordinate in the lower left quadrant. Likewise, the phases of the upper left and lower right quadrant also agree.

One consequence of the phase estimation calculation is that if a peak lies on a fractional coordinate, the components at integer coordinates to the upper left and to the lower right have identical phase (e.g., the complex numbers have identical phase angle). Similarly, the upper right and the lower left have identical phase. Further, the phases of the two distinct pairs is opposite. If one employs the more general PSF approach, the estimate of the complex frequency at the fractional coordinates will be diminished if the phases vary from the canonical configuration. This is illustrated in FIG. 26, where the peak is centered at x=85.5, y=75.5.

In practice, we find these relationships generally hold for the nearest neighbors around the non-integer location. However, some digital signal processing, such as a window function applied for DFT implementation on image blocks, may alter the relationship of phases further from the non-integer location. Effective results are obtained by relying on the nearest integer neighbors, and thus, distortion further away is not an issue.

The process of determining the geometric transform takes advantage of these phase characteristics of the reference signal components. When assessing merits of an estimated transform, these phase relationships are used to assess whether there are actual reference signal components in the suspect image at the coordinate locations determined by transforming the reference signal to those locations with the estimated transform.

In particular, one embodiment leverages the phase relationships in a complex correlation operation. An FFT of a block of the suspect image provides the complex frequency components of the suspect image at integer coordinates. For each reference signal component, a sinusoid at a particular frequency, the DLS processing logic transforms the original frequency coordinates of that component into the coordinates of the frequency domain of the suspect image (the transformed coordinates). To illustrate the complex correlation operation, we label the four nearest neighboring complex frequency components of the transformed coordinates by $F_{ul}$, $F_{ur}$, $F_{ll}$, $F_{lr}$. In this notation, F is the complex frequency component with real and imaginary parts obtained from the FFT, and subscript notation specifies its location relative to the transformed reference component: "ul" is upper left, "ur" is upper right, "ll" is lower left, and "lr" is lower right.

If a sinusoid reference component is somewhere in the square delineated by the integer coordinates of these complex frequency components, then based on the observation shown in FIG. 26, the phase of the complex components $F_{ul}$ and $F_{lr}$ match. The phase of $F_{ur}$ and $F_{ll}$ match. Further, these phases of $F_{ul}$ and $F_{ur}$ differ by 180 degrees.

The processing logic of the complex correlation determines correlation for each transformed reference signal component using the neighboring complex frequency components, $R_{ul}$, $F_{ur}$, $F_{ll}$, $F_{lr}$, with following complex linear combination:

$$a\, F_{ul} - b\, F_{ur} - c\, F_{ll} + d\, F_{lr}.$$

The coefficients a, b, c and d are all real scales between 0 and 1. These real scales are chosen to weight the frequency bin that is closest to the frequency location predicted by the estimate of the geometric transform. One choice for these coefficients is to compute the coefficients as a bi-linear interpolation of the neighboring integer values. Another choice is to use the weights obtained from the point spread function method for the fractional coordinates. Note that the phase relationships are exploited in this operation by the sign of the scale factor applied, corresponding to the fact that the phases are in the same direction or 180 degrees out of phase for the original reference signal component. This relationship should largely be maintained when the reference signal is embedded in an image (the suspect image), and when the suspect image is subjected to distortions. As such, if the suspect image phase attributes differ at a suspected location of a reference signal component, they will yield a lower correlation result. This use of phase relationship provides a more effective assessment of the presence of the reference signal component.

The correlation value for this single peak is given by the length of the complex vector resulting from the complex linear combination, $$|a\, F_{ul} - b\, F_{ur} - c\, F_{ll} + d\, F_{lr}|.$$

In one implementation, the scale factors are obtained from bilinear interpolation scaling. With the transformed reference component located at (x, y), the total complex correlation for all reference signal components is determined as shown in the following pseudocode:

```
{totCorrelation = 0;
For all reference signal components
        // (xFrac, yFraqc) = fraction of the location (x,y)
        fracX = x - floor( x );
        fracY = y - floor( y );
        // scale the complex frequency values
        ulCmplx = ulCmplx * (1 - fracX) * (1 - fracY);
        urCmplx = urCmplx * ( fracX )   * (1 - fracY);
        llCmplx = llCmplx * (1 - fracX) * (fracY);
        lrCmplx = lrCmplx * ( fracX )   * (fracY);
        // Add the complex values using the expected phase relationship
        totCmplx = ulCmplx - urCmplx - llCmplx + lrCmplx
        // Compute the magnitude
        totMag   = sqrt(Re(totCmplx)² + Im(totComplx)²));
        // Add to total correlation
        totCorrelation += totMag * scaling;
}
// totCorrelation is the final complex correlation, which is a real positive
number.
The scaling for the four neighboring integers is given by bilinear scaling:
Upper Left Scale  = (1 - fracX) * (1 - fracY)
Upper Right Scale = (fracX) * (1 - fracY)
Lower Left Scale  = (1 - fracX) * (fracY)
Lower Right Scale = (fracX) * (fracY)
```

In the coordinate update process, the processing logic implements a search for a peak in the neighborhood of each of the transformed reference signal coordinates. This search is implemented by processing logic that finds a location in the neighborhood with the highest frequency magnitude. This processing logic uses the phase estimation method to estimate the complex frequency component at candidate locations within the neighborhood. These candidate locations are defined as a two dimensional array of fractional positions around the integer coordinates of the frequency domain (the domain established by the 2D FFT of the image block).

In particular, for a frequency with fractional position, the processing logic uses phase estimation to estimate the complex peak frequency at each of the candidate locations in this array of fractional positions. While other fractions may be employed, one implementation uses ⅛ as increment between candidate positions in the x and y directions. In other words, the square area delineated by four nearest neighbors of integer coordinates is an 8 by 8 array of candidate locations. To get the phase estimate at each of the candidate locations, the processing logic samples the four neighboring complex frequency components and applies the weight factors for the fractional position, pre-stored in a look up table in memory (e.g., ROM or RAM unit) according to the phase estimation method. The complex peak at each fractional coordinate is computed using a complex correlation of the four surrounding complex frequency components and four complex weights chosen according to the estimates in phase estimation.

The processing logic of the coordinate update computes the magnitudes of all these estimates at the candidate locations to get a frequency surface that is N times larger (where 1/N is the fractional position increment) than the original frequency surface (e.g., 128 by 128, 256 by 256, 512 by 512, based on size of the digital image block and corresponding 2D FFT). Smaller portions of the surface may be used if the reference signal components are expected to be confined to be within that smaller portion. Magnitudes at the candidate locations are the length of the complex vector, real and imaginary components, which is computed, for example, as the square root of the sum of squares of the real and imaginary components at each candidate location.

To determine whether to update the reference signal coordinates, the processing logic searches for a peak in the neighborhood around the transformed reference signal coordinates of each component. The processing logic searches for the highest location in this expanded frequency domain surface. The neighborhood spans a region encompassing neighboring integer coordinates (e.g., 2 by 2 or 3 by 3 integer coordinates in the frequency domain surface), including the fractional positions within the region bounded by these integer coordinates. The location with the highest magnitude is used as the location of the reference signal component. Processing then proceeds as explained above to refine the geometric transform based on the updated reference signal coordinates.

This N-times expanded frequency surface can also be used for computing the correlation of a given geometric transform candidate. This is a variation of exploiting the phase relationship of neighboring components of the complex correlation technique described above. To review, the pseudo-code example above uses bilinear interpolation and phase relationships at neighboring integer coordinates to compute a more discriminating correlation value at a non-integer location. The phase relationships may also be exploited in the correlation metric through the point spread function weights. In this variant, computing the correlation on the N-times frequency surface computes the correlation metric using the magnitude of the complex frequency estimate provided by phase estimation at the location of each transformed reference signal component. In this way the complex frequency estimate can be used to estimate both the peak location, used in coordinate update, and the correlation value.

The expanded frequency surface may be pre-computed for an image or block of an image being examined, and stored in a look up table, indexed by fractional position. This look up table is then used to obtain a correlation metric at a non-integer location of a transformed reference component for a candidate geometric transform. Additionally, it is used to obtain the new coordinates of the reference signal component for the coordinate update process.

More background on phase estimation is provided in provisional applications 62/036,427 and 62/102,547, and counterpart non provisional application publication 2016-0188972, which are hereby incorporated by reference.

The distortion across an image block of the suspect image is often not uniform, and as such, this degrades performance of signal extraction and recognition operations that rely on approximations of uniform distortion. One example of non-uniform distortion is the above case of perspective transform. While the geometric distortion of a given image block may be approximated with an affine transform, the error in this approximation may vary across the block. Thus, the use of the approximation is not uniformly reliable for subsequent image processing operations on image samples within the block.

Figure 20:
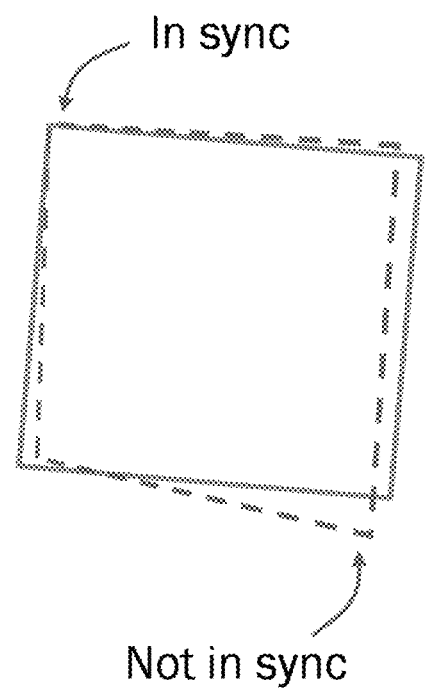
FIG. 20 is a diagram depicting an approximated geometric transformation of an image block (solid lines) superimposed over the actual distorted image block (dashed lines).

FIG. 20 is a diagram depicting an approximated geometric transformation of an image block (solid lines) superimposed over the actual distorted image block (dashed lines). In the upper left corner, the solid lines more closely match the dashed lines, illustrating that the approximated geometric distortion is closer to the actual distortion. The other extreme is illustrated in the lower right. There, the solid lines depicting the approximated geometric transform of the image block deviate more significantly from the dashed lines of the actual transformation of the image block.

One case where this error in the approximation is a problem is in digital watermark message extraction. Digital watermark message extraction is a process of extracting a message signal from locations within an image where it has been embedded (embedding locations). When the approximation of the embedding locations is inaccurate, it introduces noise in the extraction process. This noise makes extraction less reliable, and the reliability varies with the error in the approximation of embedding locations within an image block. To combat this problem, signal metrics obtained from a reference signal are used to weight message signals extracted from embedding locations in the image. Below, we detail various strategies for improving digital watermark message extraction using this approach.

In some digital watermarking applications, a digital message payload comprised of a sequence of message symbols (e.g., binary or M-ary symbols) is encoded across the image block. The message symbols are encoded to enhance robustness, using error correction and/or modulating onto a carrier signal. The resulting coded symbols are mapped to embedding locations within a block, where they are embedded by modifying the host image at the embedding locations. For instance, the host image pixel values are adjusted (e.g., luminance, chrominance, or other desired color directions) as a function of the coded symbol value, visibility threshold and robustness threshold. See, e.g., U.S. Pat. No. 8,199,969 and US Patent Publication 2015-0156369, which are hereby incorporated by reference. The payload is repeated across the span of an image by redundantly encoding the payload in image blocks (e.g., 128×128, 256×256, 512×512 pixel blocks). While several block patterns are possible, one approach is to arrange the blocks in contiguous tiles across the image. See, e.g., U.S. Pat. Nos. 6,122,403, 6,614,914, and 9,083,511, which are hereby incorporated by reference.

To extract the payload from each block in a geometrically transformed image, it is first necessary to estimate the geometric transform of the embedding locations. This process of estimating the geometric transform is sometimes referred to as synchronization or synchronizing, as it synchronizes the message extraction process on embedding locations by approximating the geometric transform between embedding locations in the original image and those in the distorted suspect image. The geometric transform provides an approximation of the original embedding locations of the digital watermark relative to the transformed embedding locations in a suspect image. There are many ways to approximate the geometric transform, some of which are detailed above. For instance, the affine transform (including translation) of the watermark signal is determined by detecting and determining the affine transform of a reference signal in the suspect image, using methods described in this document, and/or in U.S. Pat. No. 6,122,403, 6,614,914, 6,590,996, 6,483,927, 6,975,745, 7,072,490 or 8,694,049, which are hereby incorporated by reference. The reference signal may be an explicit reference signal, separate from the coded message signal. Alternatively, it may be an implicit reference signal, formed by the patterning or arrangement of the coded message symbols. See, e.g., our co-pending application Ser. No. 14/724,729, filed May 28, 2015 (Now U.S. Pat. No. 9,747,656), which is hereby incorporated by reference. In either case, the reference signal spans image blocks where the message symbols are embedded, and as such, determining its affine transform for a block provides the affine transform of the embedding locations of unknown message symbols in that block.

Once synchronized, the digital watermark message extraction proceeds to extract estimates of the coded message symbols at the embedding locations. The synchronization provides a geometric transform, which enables the message extraction process to locate embedding locations within the suspect image. Either the coordinates of the original embedding locations may be mapped by the geometric transform to the suspect image coordinate system, or the suspect image may be mapped to the coordinate system of the original embedding locations. At the embedding locations, the suspect image is sampled and filtered to obtain estimates of the coded message symbols. See, e.g., U.S. Pat. Nos. 7,231,061, and 6,590,996, which are hereby incorporated by reference.

The message symbols are then decoded from the estimates of the coded message symbols. This may include demodulating and error correction decoding. Demodulating, in this context, refers to demodulating a message from a message carrier signal. The carrier signal may be a carrier wave, such as a sinusoid or collection of sinusoids. It may also by a derivative of the host image. It may also be a pseudorandom sequence, as used in spread spectrum modulation. The modulation may be frequency shift or phase shift modulation, amplitude modulation, or the like. Demodulation, then, is the demodulation of the message from the carrier according to this modulation technique.

Error correction decoding is the counterpart of the error correction employed to generate the coded message symbols. Examples include convolutional, Reed Solomon, turbo codes, block codes, etc. Soft error correction may be employed. For example, soft error decoding may be implemented using Viterbi decoder of convolution coded message symbols. See, e.g., U.S. Pat. Nos. 7,277,468, 7,072,490 and 9,083,511, which are hereby incorporated by reference.

The reliability of the estimates of message symbols varies due to the various distortion that the suspect image has encountered subsequent to the embedding of the message. Therefore, soft decoding is preferably employed to weight the estimates according to a confidence measure. See, e.g., U.S. Pat. No. 7,466,840, which is hereby incorporated by reference.

If the geometric transform is approximated, the error in the approximation introduces errors into the estimates of the coded message symbols. To mitigate this error in the message extraction process, the estimates of the coded message symbols are weighted based on a signal confidence metric that provides a measure of reliability of the approximation at the embedding location of an estimate of a coded message symbol. This weighting is then used in subsequent decoding of the message from weighted estimates of message symbols. The subsequent decoding may include, as noted, demodulation and/or error correction decoding. In the latter case, the error correction decoding may employ a form of soft error decoding, using technologies referenced above and described further below.

Figure 21:
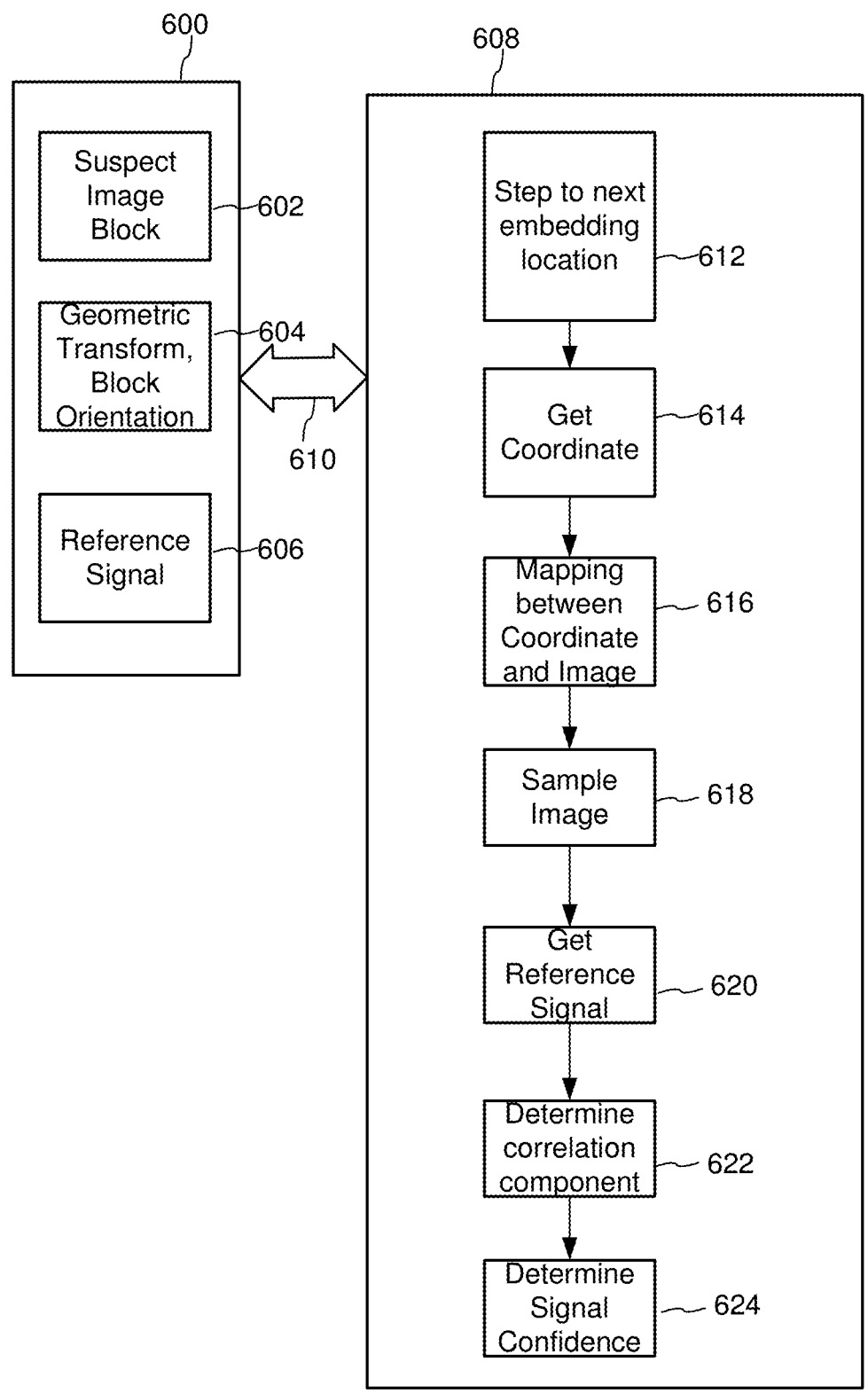
FIG. 21 is a block diagram of an implementation of processing to determine a signal confidence metric used to weight message estimates extracted from an image.

FIG. 21 is a block diagram of an implementation of processing to determine a signal confidence metric used to weight message estimates extracted from an image. As we explain through design variations, the processing flow is designed for implementation in either hardware or software. Block 600 is a memory, e.g., RAM, in which is stored a suspect image block 602, geometric transform of the block (including, e.g., block orientation) 604, and reference signal 606. Each of these data types may be stored in separate RAM units, tailored in size and bit depth depending on the needs of each. Alternatively, they may be stored in a general purpose RAM, such as typical in a software implementation for a general purpose computer. Finally, some implementations employ a combination of both. RAM units may be integrated in a pipelined hardware stage of digital logic components, as "on-chip" RAM. General purpose RAM may be accessed by digital logic (e.g., a pipeline stage), or a processor executing software or firmware via a standard bus architecture. Some of our implementations employ, for example, a bus interface, and associated control designed according AMBA bus standards.

In a pipelined implementation, digital logic for each stage of processing is arranged in a pipeline. Data is clocked through this pipeline from its input to its output. Data for intermediate calculations are captured in registers at each stage. The amount of logic and computation per pipeline stage is tuned to meet the timing window for the target clock rate. The logic for calculating a signal confidence metric per sub-block may be implemented in a pipeline, e.g., where the blocks of FIG. 21 are digital logic arranged in pipeline stages.

Block 608 is the logic executing operations to determine the confidence measure for coded message symbol estimates. This logic may be implemented as software or firmware instructions executing on a processor (e.g., CPU, GPU, DSP or the like). It may also be implemented in digital logic components (multipliers, adders, square root operator, square operator, divider, etc.) of an ASIC, FPGA, etc.

The logic 608 communicates with the data signals in memory 600 via memory interface 610. This memory interface may be implemented as a bus and associated bus interface and control logic, e.g., according to AMBA bus standards, or as control logic controlling the flow of data from on-chip RAM through pipeline stages in a digital logic pipeline. For more background on computing and hardware architectures for implementing this technology, please see provisional applications 62/188,440, filed Jul. 2, 2015, and 62/196,876, filed Jul. 24, 2015, and counterpart non provisional application Ser. No. 14/842,575, filed Sep. 1, 2015 (Now U.S. Pat. No. 9,819,950), entitled HARDWARE-ADAPTABLE WATERMARK SYSTEMS, which is hereby incorporated by reference.

Figure 22:
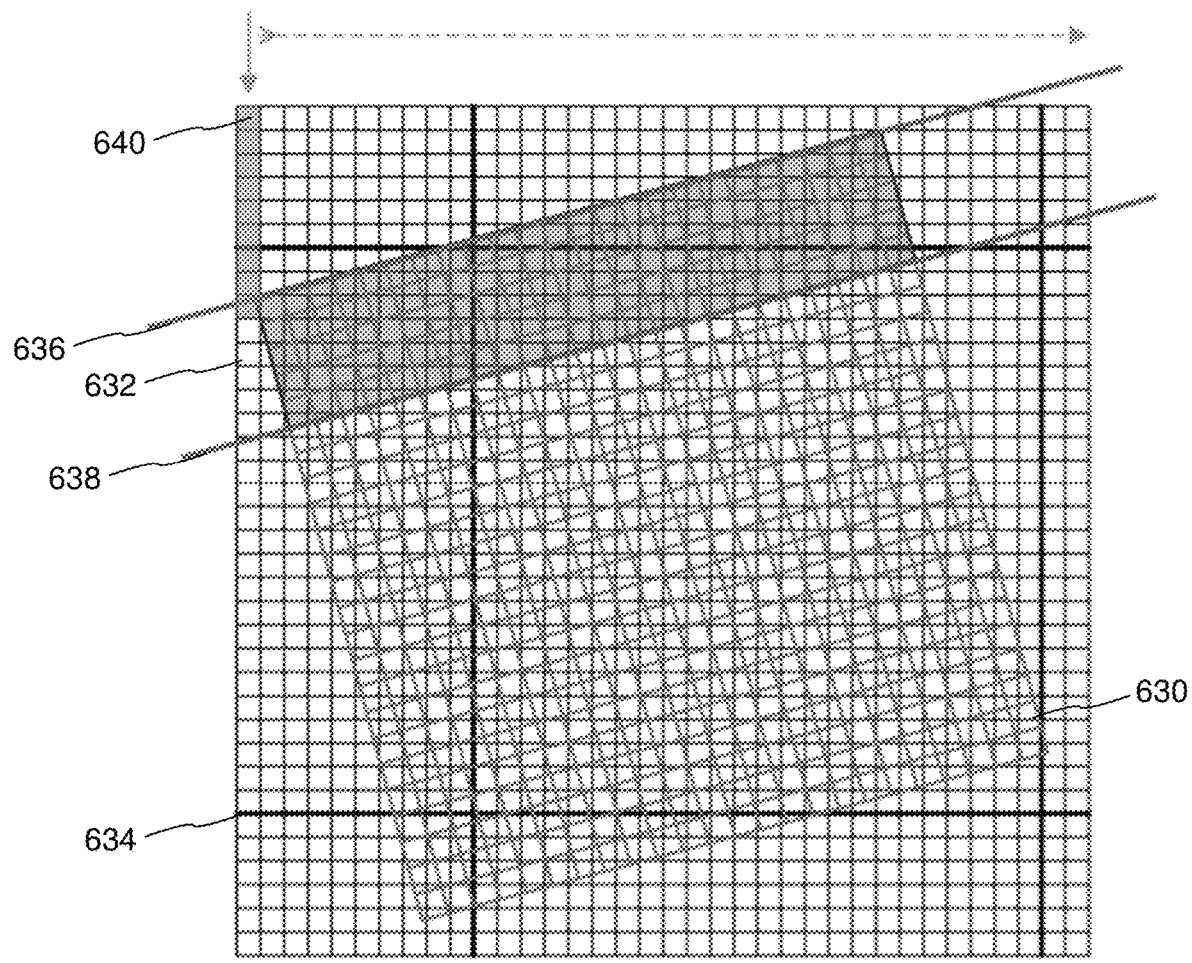
FIG. 22 is a diagram of illustrating an example of an image block superimposed over a tiled pattern of embedding locations of a digital watermark signal.

To help illustrate the operation of processing logic 608, FIG. 22 is a diagram of illustrating an example of an image block 630 superimposed over a tiled pattern of embedding locations 632 of a digital watermark signal. The tiled structure of watermark signal blocks is illustrated by the bold dark lines 634, sub-dividing the embedding locations 632 into blocks, called tiles. The embedding locations 632 considered for each image block are within a bounding region around the image block 630. The number of embedding locations per tile may vary with the application as noted, and the number shown here is just an example for illustration. From the synchronization process, the geometric transform of the image block is approximated and reflected in this example as an image block with a rotation, scale and translation shift relative to the watermark tiles. As shown in FIG. 20, the actual geometric transformation of the image block may not be affine, but instead may be distorted (e.g., by perspective transform, or other transform due to camera orientation and/or surface orientation of the image).

In this implementation, the logic processes the suspect image 630 by advancing along the embedding locations of the digital watermark signal. The lines 636 and 638 are added to illustrate that a slice of the image block 630 is processed at a time. In this case, the slice of image data is processed in memory 602, and then the logic 608 advances to the next slice, after completing a traverse of the image data in the slice. For example, image memory may be implemented with on-chip RAM as well as off-chip RAM, with slices of image added to the on chip RAM via an AMBA bus from the off-chip RAM.

The logic 608 traverses the image along columns of embedding locations. The highlighted portion 640 in the first column, and arrow above it, depicts the direction that the logic advances: down each column, then stepping to the next column. This is a matter of design choice (column by column vs. row by row), as is the choice of mapping embedding locations into the image, as opposed to mapping image pixels into embedding locations. Counters are used to track the image block line, and top and bottom pixel rows in the memory buffer. Registers keep track of the position in each column that image data has been extracted from.

Returning again to FIG. 21, the logic of block 612 advances to the next embedding location. The geometric transform of the image block, in this implementation, is stored in memory unit 604 and includes the affine transform parameters, including translation, which is specified to sub-pixel accuracy (e.g., to a fractional position between pixel coordinates as described above for the phase deviation process). The logic of block 614 determines the coordinate of the embedding location relative to tile center and adds the fractional part of the translation to it. The logic of block 616 maps the coordinate of the embedding location to a position in the image by applying a vector multiplication of the coordinate by the geometric transform parameters. It determines if this position falls within the image buffer (by checking against top, bottom, left and right bounds). If so, the logic of block 618 samples the image values around the mapped position. This is implemented as an interpolation operation on the four neighboring pixels to the position of the mapped coordinate.

In one implementation, the sampling operation of the image operates in conjunction with a pre-filtering operation. Pre-filtering, in the case of digital watermark extraction, refers to a preliminary filtering of the suspect image to prepare it for extraction. One aspect of the filtering is to enhance the watermark signal relative to noise and host signal interference. See, e.g., U.S. Pat. Nos. 6,590,996, 7,231,061, 7,076,082, which describe various pre-filtering operations. The filtering operation compares an image sample at a position relative to image values at neighboring positions and outputs a new value for that position, as a function of the comparisons. For each compare operation, for example, an intermediate output is positive, zero, or negative integer value depending on whether the image sample at the mapped position is greater, equal to, or less than the neighboring value. The intermediate values are then combined (e.g., summed) to provide an output value ranging from some positive integer to a negative integer (e.g., −2, −1, 0, 1, 2 for filters comparing horizontal and vertical neighbors; −8 to 8 for filters comparing 8 neighbors, at horizontal, vertical and diagonal directions). In some embodiments, the compare operation compares the image sample with a function of neighboring values, such as a median or average of neighboring values.

To implement the pre-filter on transformed embedding locations, the logic maps each of the filter sample locations from a position neighboring the embedding location to a mapped sample position in the suspect image by vector multiplication of the affine transform. Image values for the mapped positions are sampled by interpolating the four neighboring pixels as described above. The filter operator takes these sampled values as input, compares them with the sampled value for the embedding location to produce intermediate values, and outputs a filter output value as function of the intermediate values. We explain an embodiment in more detail below, along with additional illustrations in FIGS. 23-25. These sampling and filtering operations within the processing logic of block 618 provide the image signal input of the signal confidence metric. Since the signal confidence metric depends on correlation of image and reference signal at an embedding location, the processing logic of FIG. 21 proceeds to obtain the reference signal component at the embedding location.

The logic of block 620 obtains the reference signal component at the embedding location from reference signal memory 606, with adjustments as necessary to align it with the image sub-block. There are a number of implementation variations within this operation. One aspect of the design is the form of the reference signal. In one implementation, the reference signal is a constellation of sinusoids, each with pseudorandom phase. In this case, the DC component is removed from the reference signal by subtracting its mean, and the result is converted to a spatial domain tile of pixel values. In other implementations, the reference signal is an arrangement of pixels in a tile, corresponding to a fixed message signal or an implicit reference signal formed from an arrangement of message signal components.

Another aspect of the design is the process adjusting reference signal and/or image to align them. For example, certain adjustments may be needed to transform the reference signal or image block to align them. In one implementation, the spatial domain tile of the reference signal is rotated to match the orientation of the image block. In this context, orientation refers to 1 of 4 orientation states at 90 degree rotations relative to each other, which is obtained from the synchronization process. This orientation state is apart from the rotation angle parameter of the geometric transform, which is an angle in the range of 0-90 degrees. The number of orientation states depends on the design of the reference signal. For a reference signal that has octant symmetry in the Fourier domain, there are 4 orientation states. For a reference signal that has quadrant symmetry in the Fourier domain, there are 2 orientation states (0 and 180 degree).

Another aspect of transforming the reference signal is transforming to account for the translation of the reference signal, which is derived through the synchronization process. Prior to sampling the reference signal at an embedding location within a tile, the translation of the reference signal is adjusted to correspond to the translation of the image block. This orientation and translation adjustment is used to generate a spatial domain samples of the reference signal for use in deriving a signal confidence metric. The generated reference signal is then accessed by the logic of block 620 to get the reference signal value that corresponds to the embedding location currently being processed.

When implementing the logic of 620, there are alternative design considerations, depending, for example, on processing speed and chip area objectives and limitations. One approach is to generate a full spatial domain image tile of the reference signal and store it in a memory unit, which is accessed via a bus or within a buffer on-chip to look up the reference signal spatial domain value at an embedding location in the tile. For a digital logic implementation, this full tile requires a larger on-chip RAM to buffer the spatial domain reference signal, which may be too costly. An alternative is to generate smaller parts of the spatial domain reference signal as needed, and store them in a much smaller buffer within the digital logic pipeline for message extraction. When the logic of block 620 gets the reference signal, it does so for the part of the reference signal corresponding to the current embedding location.

The logic of block 622 logic determines a component of correlation between reference signal and image signal at an embedding location. This operation may be performed as the logic visits each embedding location, sampling the image and reference signal values at the embedding location. It may also be implemented by buffering a sub-block of the suspect image and reference signal, after spatially aligning them, and then executing a vector multiplication or compare of the image and reference signal sub-blocks as a component of a correlation (e.g., a vector dot product). For a pipelined digital logic design, it is preferred to generate the image and reference signal only as needed for an embedding location, determine the correlation component for this location, and then accumulate the correlation components, as the pipeline stages visit embedding location.

The logic of block 624 performs operations to determine a signal confidence metric for a sub-block of a tile. It determines the signal confidence metric by summing the correlation components of the sub-block. To compute this metric, the execution of the logic of 612-620 repeats for embedding locations until embedding locations for an entire sub-block have been visited. The outputs are summed for the sub-block. The sum is then normalized based on the total energy of the sub-block. As noted, there are variations in the order of operations, depending on design considerations regarding circuit chip area, power consumption, and processing speed constraints and memory bandwidth constraints (where chunks of image data and output are loaded to and from a pipelined processor from a RAM memory via a bus).

The particular implementation of a normalized confidence metric may vary. There are a variety of ways to measure signal correlation and normalize it by the energy within the sub-block. The signal correlation, in our implementations, is computed by multiplying corresponding image and reference signal values in the spatial domain and summing the resulting products. This may be carried out with other types of correlation, such as compare operations or weighted compare operations. It may be carried out on samples of the two signals in other domains (e.g., frequency or other transform domain of the watermark signal), depending on the watermark signal design and tolerance for additional chip area for memory and logic to transform image and reference signal to/from other domains. The values used for the image signal may be pre-filtered or not-filtered, though pre-filtering provides the advantage of suppressing noise and/or host signal interference. This has the benefit of emphasizing watermark signal content of the suspect image, prior to measuring signal confidence relative to the reference signal. To normalize the signal correlation, the sum of correlation components is divided by the signal energy of the sub-block. Energy, in one implementation, is computed as the square root of the sum of squared reference signal components of a sub-block, multiplied by the sum of squared image signal components of the sub-block. The image signal components used for the energy computation are the same as those used for the signal correlation, and may be filtered or not filtered.

A similar methodology may be employed where the reference signal is comprised of fixed or known message symbols or a pattern of message symbols. Here, fixed means that these message symbols do not change, in contrast to symbols of variable message fields, where the symbol values change to carry variable messages (and as such, are unknown until they are reliably decoded). "Known" symbols are symbols that are either pre-determined, such as fixed symbols, or have been ascertained in a previous extraction stage. As an example, the reference signal may be fixed message symbols, which are mapped to embedding locations within a tile, and thus, correspond to a spatial image tile. However, to provide a reliable signal confidence metric for unknown message symbols for a sub-block, it is preferable to employ a reference signal that has independence from the unknown message symbols. This level of independence may be achieved by selecting orthogonal vectors for the reference signal relative to the variable message signal. See a discussion of orthogonal vectors in co-pending application Ser. No. 14/724,729, incorporated above, for example.

Various combinations of the above reference signal strategies may be used to provide signal confidence metrics. For example, the signal confidence of a sub-block may be a function of signal confidence based on a reference signal comprised of an array of sinusoids combined with a signal confidence based on a reference signal comprised of an array of known message symbols scattered over embedding locations within each image tile.

For a tile of N by N embedding locations (e.g., 64, 128, 256, 512), the sub-block size used for producing the signal confidence metric is a fraction of the tile. In experiments using sub-blocks of various sizes, we found that smaller sub-blocks (e.g., N/8 by N/8 sub-blocks) yield better results when the affine transform does not accurately represent the geometric transform across the span of the tile, as in the case where there is a perspective transform. Conversely, where the geometric transform is more closely modeled with an affine transform, larger sub-blocks yield better results (e.g., N/4 by N/4 sub-blocks).

When selecting sub-block sizes, there are tradeoffs to consider. Larger sub-blocks are better for giving reliable correlation values, whereas smaller sub-blocks are better when the image block has been subjected to a perspective transform or other non-affine distortions (e.g., due to the tilt of the camera relative to the watermarked object when the camera captures an image of that object, deformation of the object surface (images deformed by manipulation of flexible packages or materials), irregular shaped object (such as curved surfaces), etc.). Also, as the image undergoes manipulations (either inadvertent or intentional), these manipulations may adversely impact macro characteristics (e.g., larger sub-blocks) but might leave micro characteristics (e.g., smaller sub-blocks) intact.

Adaptively choosing the size of the sub-blocks provides a way to make the most optimal choice depending on existing SNR conditions. For example, in one embodiment the processing logic is configured to compute correlations for sub-blocks of multiple size. Then for each region, the processing logic determines the best configuration of sub-block size to perform correlations, inform demodulation decisions, and/or adjust the local transform.

Another optimization that may be employed to combat errors in the approximation of the geometric transform of a sub-block is to use the signal confidence metric as an indicator to refine the geometric transform for the sub-block. The signal confidence metric provides a measure of the degree to which an image sub-block is aligned with the original sub-block at the time of watermark embedding. If the signal confidence metric indicates that the alignment has some merit, yet might be improved (e.g., is below a desired level of correlation), then the logic may trigger execution of refinement logic. In the refinement logic, one or more of the geometric transform parameters are adjusted slightly and the signal confidence re-computed to determine whether the signal confidence metric improves. The signal confidence metric, as noted, may be comprised of confidence based on different forms of reference signals, including sinusoids (e.g., points in the frequency domain) and message symbol patterns. In the latter case, the message symbol patterns may be assessed using message extraction methodology, namely: sample the suspect image at an embedding location or set of embedding locations corresponding to a known message symbol and compare decoded message symbol estimate with known message symbol. Here, a derived image signal characteristic at embedding location(s) may serve as a proxy for the known message symbol to avoid the need to fully transform image values into decoded symbols. For example, if the symbol is embedded by shifting an image value (e.g., spatial domain magnitude or position, frequency domain magnitude or phase, etc.), the direction of the shift and/or sign of the adjustment (positive or negative) may serve as a proxy for the message symbol. This proxy is compared with the expected shift for each of the known message symbols in sub-block, and the results summed to provide a signal confidence metric. For example, one form of normalized correlation is to divide the sum of products of expected value and estimated value by the sum of the absolute value of the estimated values. The expected value may be represented by a sign of signal shift (positive and negative) and the estimated values represented by the filtered output at an embedding location, as determined by the above-described pre-filter.

One form of refinement is to search a set of translation parameter adjustments for an adjustment that improves the signal confidence metric. Where the signal confidence metric is based on two different signal measurements, the logic may determine that the signal confidence has improved where a maximum for both metrics in the set of adjustments correspond to the same parameter adjustment. One search strategy is to check for improved signal confidence using small translation shifts, e.g., at one or two sample locations up, down, left, right around each affine transformed sub-block. Other search strategies may be employed for searching a local subspace of geometric transform parameters for each sub-block to find updated transform parameters that improve the signal confidence metric. See also, U.S. Pat. No. 6,975,745, which is hereby incorporated by reference, for additional examples on refining transform parameters, synchronization for digital watermark extraction, and use of soft decoding for digital message extraction.

Signal confidence metrics may be generated from other types of signal processing operations. Various signal correlation measures, for example, are detailed above and in incorporated documents. The signal processing used to ascertain correlation metrics in DLS, and phase deviation, are additional examples of signal confidence metrics. For more on phase deviation as a signal metric, please see related published US Application 2015-0071565, which is hereby incorporated by reference.

After one or more iterations of refinement, the weighting and message symbol estimates used in decoding are those derived from the refined sub-block.

Figure 23:
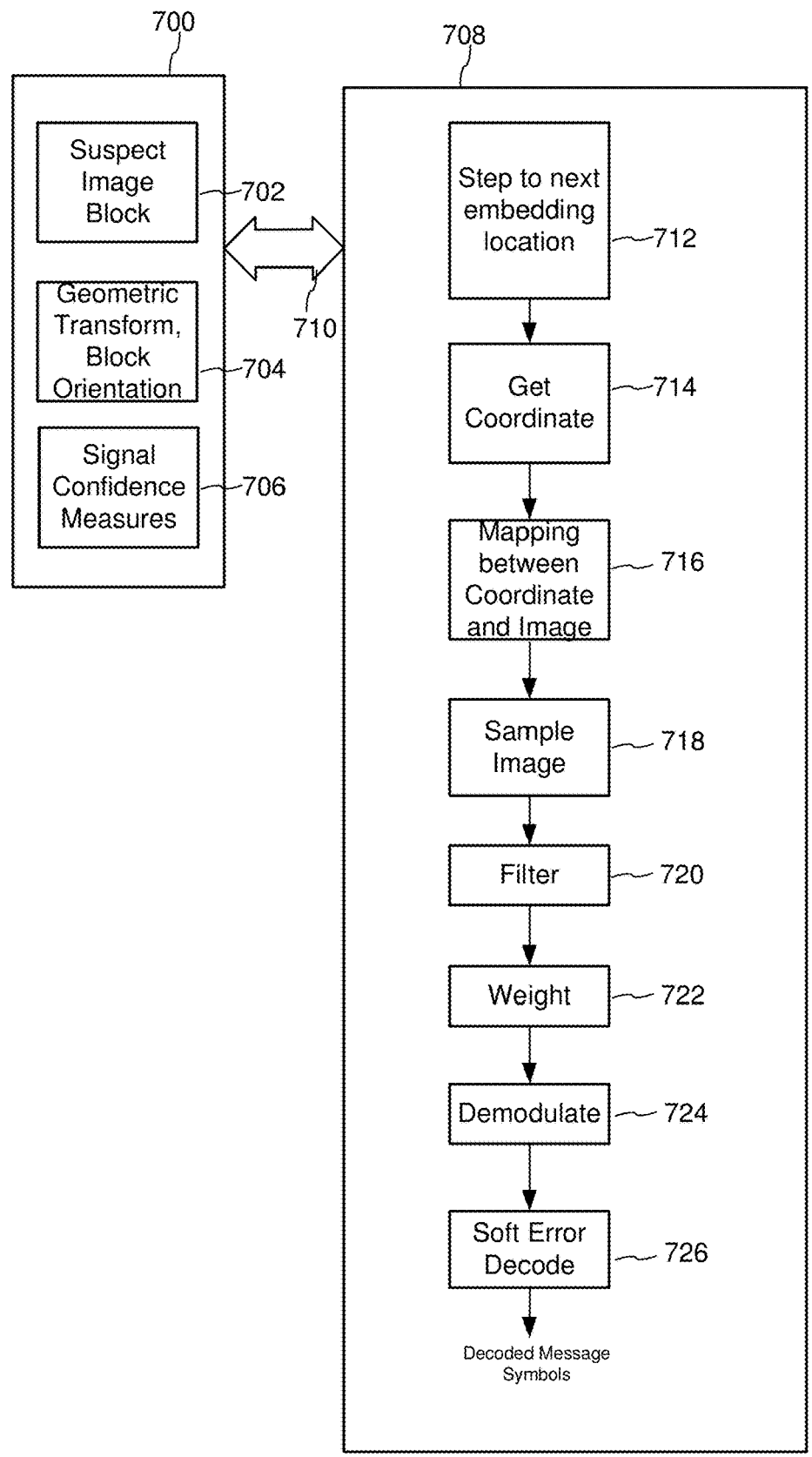
FIG. 23 is a diagram illustrating an implementation of message signal extraction that employs weighting by signal confidence metrics.

Having described signal confidence metrics, we now turn to message extraction in more detail. FIG. 23 is a diagram illustrating an implementation of message signal extraction. The design of this processing logic parallels that of the processing logic of FIG. 21. Indeed, the processing logic may be integrated, such that the processing is executed in parallel, sharing similar operations. Alternatively, the processing may be executed in stages, potentially re-using common processing operations. As in FIG. 21, FIG. 23 depicts memory 700, which includes memory units for storing an image block 702, the geometric transform for the image block 704, and signal confidence measures (e.g., where they have been previously derived) 706. The processing logic of message extraction 708 interacts with memory 700 via memory interface 710, which may be implemented similarly to the alternatives outlined previously for FIG. 21.

The processing of the logic of blocks 712, 714, 716, and 718 follows that of the logic of blocks 612, 614, 616 and 618 of FIG. 21.

Above, we described that the signal metric of a sub-block may be computed based on pre-filtered image samples of the image block. The message extraction process also employs a pre-filter, shown as processing logic block 720. Indeed, the pre-filter for deriving signal confidence weights may be the same as the pre-filter for extracting coded message symbol estimates. We describe and illustrate an implementation of this pre-filtering in more detail here.

Figure 24:
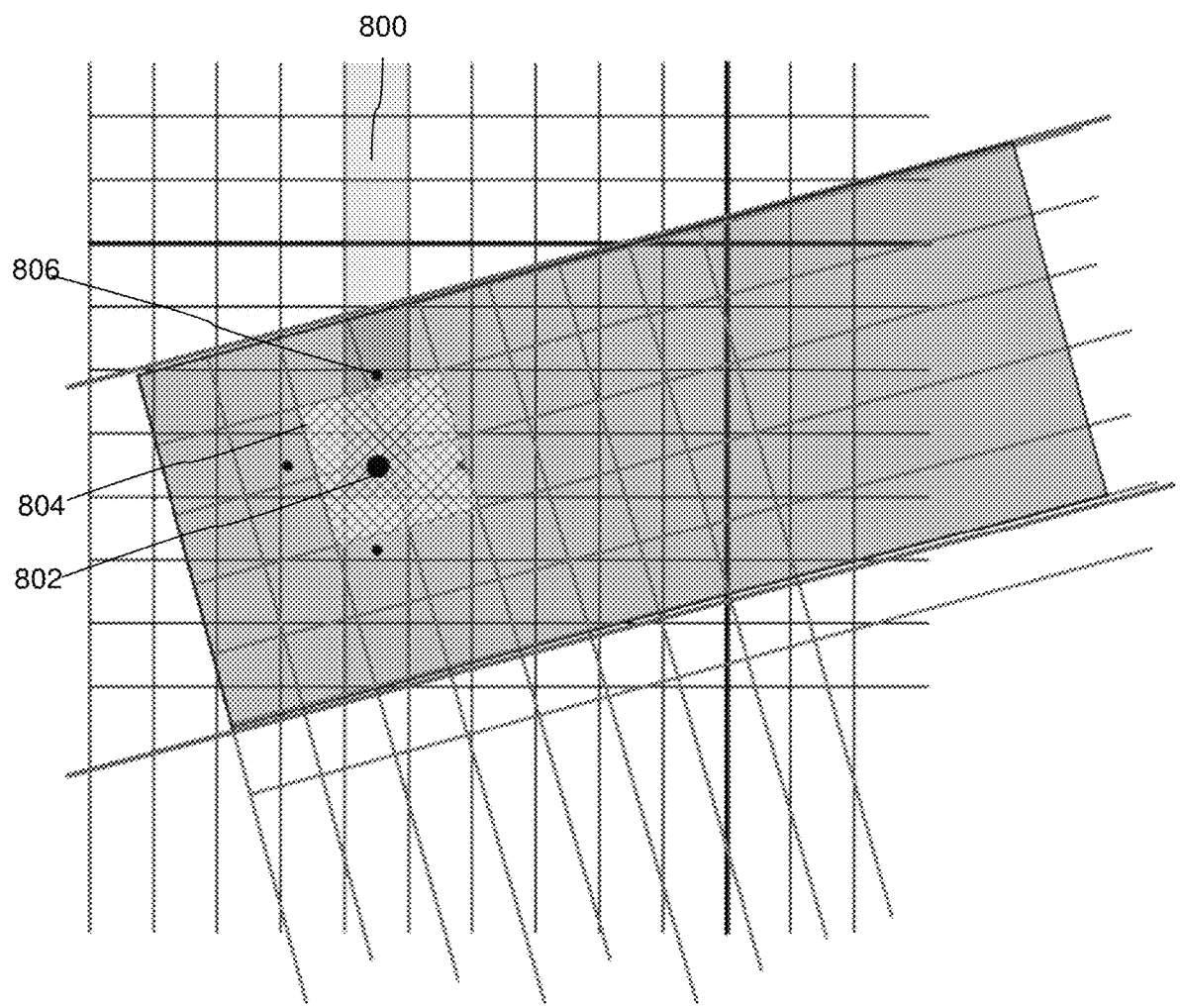
FIG. 24 illustrates an expanded view of the image block superimposed over embedding locations from FIG. 22, highlighting an example of filtering the image block.
Figure 25:
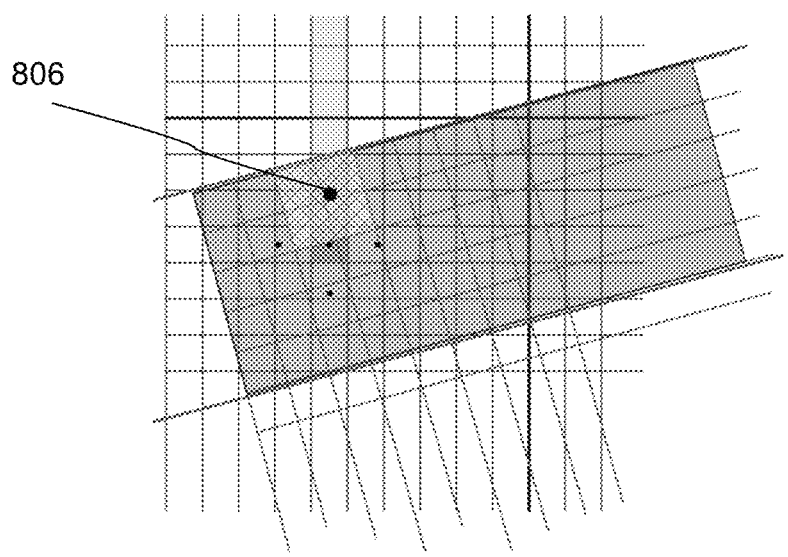
FIG. 25 shows an example of sampling of the image block for use in image filtering and extraction of message estimates.

FIG. 24 illustrates an expanded view of the image block superimposed over embedding locations from FIG. 22, highlighting an example of filtering the image block. Whereas FIG. 22 illustrated that processing logic began the traversal of embedding locations at the first column 640, FIG. 24 shows an example where processing of the image block has advanced to column 5 (800), and in particular to an embedding location at the enlarged dot 802. The processing logic maps the embedding location into the image by applying a vector multiplication of the affine transform determined through the synchronization process, with adjustments as described above. The four neighboring pixels of the mapped coordinates of the embedding location (cross hatched area 804) are obtained from the image buffer and interpolated to determine the image value at the embedding location 802. After adjusting for the translational offset of the neighboring locations, the logic repeats this process for four neighboring locations (up, down, left and right of the embedding location), which are shown as the smaller black dots (e.g., 806 for the neighboring position above embedding location 802). FIG. 25, for example, shows the sampling of the image block for this neighboring position 806.

Returning to FIG. 23, the filter of processing block 720 is applied by comparing the sampled image value at position 802 with the sampled image values at the neighboring positions. In one implementation, this operation is a comparison of the image sample at the embedding location 802 with an average of the left and right image samples and an average of the top and bottom image samples. Each comparison produces an intermediate output of −1, 0, or 1 for less than, equal to, or greater than. The intermediate output is then summed, and the filter output is set to the sum for the embedding location. This process repeats as the logic traverses the embedding locations. The results are estimates of coded symbols, which are stored in separate arrays corresponding to each coded symbol in the message being extracted.

In processing logic 722, these coded symbol estimates are weighted. Each of the filter output for an embedding location has a corresponding weight, which is the signal confidence metric of the sub-block in which the embedding location is located. These weights are generated from the processing logic of FIG. 21, buffered, and then applied in the processing logic of 722 to the estimate values in the arrays. The weight for a sub-block is applied to a corresponding coded symbol estimate by scaling the estimate by the weight.

The processing logic of 724 demodulates the weighted, coded symbol estimates. The particular processing of the demodulator operation depends, of course, on the form of the modulation applied to coded symbols. Each weighted symbol estimate in an array is a signal element that may contribute to the demodulated, coded symbol estimate. For example, where the coded symbol is modulated onto a carrier, the demodulator employs the carrier to demodulate a coded symbol estimate from the weighted signal elements in the array. For spread spectrum demodulation, the weighted signal elements are chip estimates, which are demodulated by multiplying or XORing by the carrier element of the chip, and the result is accumulated for all of the weighted estimates in the array. Other forms of modulated symbols may be demodulated in appropriate fashion, according to the type of modulation applied and carrier signal. The result of the demodulation is an accumulated result from the weighted signal estimates input to the demodulator. This accumulated result, is itself, a weighted estimate of a coded message symbol for another stage of message decoding (e.g., error correction decoding or weighted correlation decoding).

The processing logic of block 726 performs a soft error correction decoding on the weighted estimates of the coded message symbols produced by the demodulator. As noted, several alternative error correction decoding methodologies may be employed, including convolutional codes, turbo codes, block codes, BCH, Reed Solomon, etc. Convolutional decoding, employing a Viterbi decoding is one particular approach for soft decoding of weighted message symbol estimates, but various other soft decoding schemes may be employed.

An alternative method of decoding that exploits the signal confidence metric is to employ a weighted correlation. In this method, the weighted message symbol estimates are correlated with each of set of candidate message symbol strings. The weights are obtained using the signal confidence metrics of this document. Consider applications where a sequence of unknown message symbols is comprised of a relatively small number of candidate message symbol strings. In this case, the error correction decoding is not needed because the expected values of the candidate message symbol strings are correlated directly with the corresponding elements of the weighted message symbol estimates (e.g., output from the demodulator). A correlation threshold is established for the candidate message strings. When the weighted correlation operation output exceeds the threshold, this candidate string is deemed to be reliably decoded.

Another optimization is to exploit information of known watermark signal components in the extraction filter. The extraction filter may be adapted to take into account the known symbols for extraction of unknown message symbols at points or regions adjacent to or overlapping embedding locations where there are known message symbols.

To further illustrate, we use the particular example of the extraction filter described here. This extraction filter operates on a 3×3 region of embedding locations to calculate an estimate of the central location's unknown message symbol value. One optimization is to adapt the filter to apply weightings to the sampled values around the central location based on estimated and expected values.

The filter operation is executed in multiple passes over the image block being examined. In a first pass, the extraction logic derives a measure of signal strength values for the known message symbols. It does so, for example by correlating expected and measured values at the locations of known message symbols in the block. For example, the known message symbol value has an expected value, which may be simplified to a positive or negative adjustment. The expected signs of known message symbols are correlated with the filter output for all embedding locations of known symbols in the area (e.g., within a block or sub-block of the embedding location of interest) to provide a signal confidence metric.

Next, the extraction logic determines estimates of the unknown message symbols, where the extraction filter has input points weighted by the signal confidence metric of adjacent or overlapping known message signals.

This process may be iterated, with each pass calculating a confidence metric for a block or sub-block to determine if the confidence has improved. Processing continues until a limit of iterations is reached, signal confidence metric is not improved, or the message has been successfully decoded. If an acceptable confidence metric is achieved, the extraction logic proceeds to the message decoding stage, where a trial decoding is attempted and the output of the decoding tested for validity (e.g., through error detection bits like a CRC).

This optimization may be integrated in the above method for refining alignment with translation adjustments. These two approaches are compatible with each other because they exploit known symbols as a metric for signal confidence.

Additionally, as unknown message symbols are decoded reliably, the extraction process converts them to expected values of now known symbols at embedding locations within a block. These known message symbols may be used to derive signal confidence metrics for weighting the decoding of unknown symbols in subsequent passes. The conversion to expected values may be accomplished by decoding a sequence of unknown symbols and then generating expected values for the decoded symbols. The decoding may be error correction decoding or weighted correlation decoding. Once decoded, the expected values of the message symbols are generated from the decoded message. This generating of expected values follow the encoding methodology used to encode unknown symbols (e.g., error correction coding and/or modulation on a carrier to create coded message symbols at embedding locations in the block).

Due to slight affine transform error in the transform estimated by earlier detector stages, the initial alignment of the sample points for the extraction filter are usually slightly misaligned. Thus, during sampling, some or all of the 3×3 region of extraction filter input samples contain more of the message symbol content of neighboring embedding locations. Where there are known expected values at these neighboring locations, the extraction filter input for these sample locations is weighted to reduce or offset contribution of the neighboring value.

Alternatively, the whole 3×3 image neighborhood (or larger or sub-sampled region, depending on image resolution) is correlated against an estimated neighborhood comprising known message symbol values and both positive or negative unknown message symbol values. The best correlation is retained, and used to iterate again over the image block where known values fill in for previously unknown values alongside the known message values for second or further passes.

Other patent documents by the applicant detail additional watermarking technology that can be used in conjunction with the present arrangements (and into which the present arrangements can be incorporated). Examples include the following patents, publications and co-pending applications: Ser. No. 14/520,160, filed Oct. 21, 2014 (published as US 2015-0106416), and 62/102,547, filed Jan. 12, 2015 (e.g., providing related teaching on phase estimation; now published in US 2016-0188972); U.S. Pat. No. 7,072,487 (e.g., providing teaching on adapting color vectors employed by a watermark detector); U.S. Pat. No. 7,231,061 (e.g., teaching adaptive prediction filtering, including pre-filtering operations); U.S. Pat. No. 7,076,082 (e.g., describing a lookup-based implementation of pre-filtering); 20120129574 (e.g., describing watermark detection in adverse lighting using adaptive signal detection); U.S. Pat. No. 6,988,202 (e.g., providing more on pre-filtering to increase watermark signal-to-noise ratio); U.S. Pat. Nos. 7,978,875, 7,574,014, 7,013,021 and 6,442,284 (e.g., describing block selection in suspect images, namely to identify areas of imagery most likely to have decodable watermark data); U.S. Pat. No. 6,516,079 (e.g., determining detection thresholds to control stages of a watermark detector); U.S. Pat. No. 8,891,811 (e.g., image block traversal and selection strategy); 20120214515 (e.g., audio watermarking); Ser. No. 14/725,399, filed May 29, 2015 (e.g., detailing sparse data signal embedding arrangements)(Now U.S. Pat. No. 9,635,378); Ser. No. 14/724,729, filed May 28, 2015 (e.g., teaching different synchronization and modulation techniques)(Now U.S. Pat. No. 9,747,656); and U.S. Pat. No. 6,975,745 (e.g., refining estimates based on local block correlations; phase locking).

For more on computing and hardware architectures for implementing the above technology, please see provisional application 62/188,440, filed Jul. 2, 2015, and counterpart non-provisional application Ser. No. 14/842,575, filed Sep. 1, 2015, entitled HARDWARE-ADAPTABLE WATERMARK SYSTEMS, which is hereby incorporated by reference.

The above least squares, phase estimation and phase deviation methods can be performed by a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, applicant means a particular structure, namely a multipurpose, clock-driven integrated circuit that includes both integer and floating point arithmetic logic units (ALUs), control logic, a collection of registers, and scratchpad memory (e.g., cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of the above detailed methods on a microprocessor involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. Both the source code and the machine code are regarded as software instructions herein.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices. They are attractive choices in some applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

While microprocessors can be reprogrammed, by suitable software, to perform a variety of different algorithms, ASICs cannot. An ASIC is designed and fabricated to serve a dedicated task.

An ASIC structure comprises an array of circuitry that is custom-designed to perform a particular function. There are two generally classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. A consequence of this hardware structure is that many of the fabricated gates—commonly a majority—are typically left unused.

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithm (and others that follow), offer higher performance, and consume less power, than implementations employing microprocessors. A drawback, however, is the significant time and expense required to design and fabricate circuitry that is tailor-made for one particular application.

A particular implementation of the above-detailed methods using an ASIC again begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed methods is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise, with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above methods on an FPGA begin by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the above methods. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the reference signal and transform seed candidates can be defined by parameters stored in a re-writable memory. By such arrangement, the same ASIC may be incorporated into two disparate devices, that employ different reference signals and associated transform parameters. One may be a point of sale scanner for reading watermark-encoded product identifiers hidden in grocery item packaging—which looks for a first reference signal. A second may be an age verification terminal for reading watermark-encoded birthdate information hidden in a driver's license—which looks for a second reference signal with frequency components at different frequency locations and having different phase. The chips are all identically produced in a single semiconductor fab, but are differentiated in their end-use by reference signal and watermark key parameters stored in on-chip memory.

Yet another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations associated with some or all of: FFT transformation, log-polar sampling, matched filtering, and correlation. However, such native instruction set would lack certain of the instructions available in more general purpose microprocessors.

(Reconfigurable hardware and ASIP arrangements are further detailed in application Ser. No. 14/842,575, filed Sep. 1, 2015, the disclosure of which is incorporated herein by reference.)

Examples of Embodiments

This section provides examples of various inventive configurations of technology described in this document.

A1. A system for determining a geometric transform of an image signal, the system comprising:

memory in which is stored a reference signal and an image, which includes the reference signal;

a programmed processor, the programmed processor executing instructions to:

transform components of the reference signal by applying a geometric transform to the components, the geometric transform starting with transform candidate seeds, the transform candidate seeds comprising rotation angle, scale, shear and differential scale parameters;

compute correlation between the transformed reference signal components and the image;

sample the image to determine new locations neighboring the transformed components;

update the geometric transform by determining a least squares transform that transforms the components of the reference signal to the new locations;

assess the updated transform based on correlation between the image and the components transformed by the updated geometric transform; and repeat execution of the instructions to sample and update to refine the geometric transform based on correlation between the image and the components transformed by the updated geometric transform.

A2. A digital logic circuit for determining a geometric transform of an image signal, the circuit comprising:

memory in which is stored a reference signal and an image, which includes the reference signal;

transform logic for transforming components of the reference signal by applying a geometric transform to the components, the geometric transform starting with transform candidate seeds, the transform candidate seeds comprising rotation angle, scale, shear and differential scale parameters;

correlation logic for computing correlation between the transformed reference signal components and the image;

sampling logic for sampling the image to determine new locations neighboring the transformed components;

update logic for updating the geometric transform by determining a least squares transform that transforms the components of the reference signal to the new locations;

and logic for controlling iterations of processing of the transform, correlation, sampling and update logic based on correlation between the image and the components transformed by the updated geometric transform.

A3. A method for digital message extraction from digital data encoded in an image, the method comprising:

from electronic memory, obtaining image samples from an image block and geometric transform parameters that approximate a geometric transform of embedding locations of the digital data encoded in the image samples of the image block;

executing instructions in a processor to:

obtain a measure of signal confidence of a reference signal in the sub-block of the image block where the geometric transform parameters are applied to provide a geometric transform between the embedding locations and the sub-block;

extract message estimates from embedding locations of the sub-blocks of the image block;

weight the message estimates by the signal confidence of the sub-block from which the message estimates are extracted; and decode a message from the weighted message estimates.

A4. A digital logic circuit for digital message extraction from digital data encoded in an image, the circuit comprising:

coordinate transform logic to determine a transform between coordinates of embedding locations and an image block of the image, the coordinate transform logic applying a geometric transform approximating a transformation between the embedding locations and the image block;

sampling logic for sampling the image block based on the transform;

correlation logic for determining correlation between samples of a sub-block of the image block and a reference signal, the correlation providing a signal confidence metric for the sub-block;

message estimate extraction logic for extracting message estimates from embedding locations in the sub-block;

weighting logic for applying the signal confidence metric as a weight for message estimates of the embedding locations in the sub-block; and decoding logic for decoding message symbols from the weighted message estimates.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for DLS, phase estimation and phase deviation may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to determine linear transforms, phase shift and translation between signals.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

The invention claimed is:

1. A method for digital message extraction from digital data encoded in an image, the method comprising:

from electronic memory, obtaining image samples from an image block and geometric transform parameters that approximate a geometric transform of embedding locations of the digital data encoded in the image samples of the image block;

executing instructions in a processor to:

obtain a measure of signal confidence of a reference signal in a sub-block of the image block where the geometric transform parameters are applied to provide a geometric transform between the embedding locations and the sub-block, the signal confidence being computed as a sum of correlation components of the sub-block, and the signal confidence being normalized by dividing the sum of correlation components by energy of the sub-block;

extract message estimates from embedding locations of the sub-block of the image block;

weight the message estimates by the normalized signal confidence of the sub-block from which the message estimates are extracted; and decode a message from the weighted message estimates.

2. The method of claim 1 comprising:

with a programmed processor or digital logic circuit:

transforming the image into a frequency domain to produce a discrete frequency domain representation of the image at integer coordinates;

estimating phase at non-integer coordinates within the discrete frequency domain representation of the image according to a point spread function;

for plural reference signal components of the reference signal:

transforming coordinates of a reference signal component according to a candidate geometric transform;
updating the coordinates of the reference signal component to a location within a neighborhood of the discrete frequency domain representation around the coordinates of the transformed reference signal component, the location corresponding to a highest frequency magnitude value of frequency magnitude values within the neighborhood, wherein frequency magnitude values at non-integer locations in the neighborhood are computed using the phase estimated at non-integer locations;
determining a new geometric transform that transforms the reference signal components to the updated coordinates; and
applying the new geometric transform to extract encoded digital data from the image.

3. The method of claim 2 wherein estimating phase at non-integer coordinates comprises estimating complex frequency components at the non-integer coordinates by applying weights obtained from the point spread function to neighboring complex frequency components at integer locations;
and wherein the frequency magnitude values within the neighborhood are magnitude values of the complex frequency components in the neighborhood.

4. The method of claim 2 wherein the reference signal components comprise peaks in the frequency domain.

5. The method of claim 2 wherein the reference signal components comprise sinusoids.

6. The method of claim 2 further comprising:
measuring correlation between the transformed reference signal component and the image;
for geometric transform candidates, performing the transforming of coordinates and the measuring of correlation with a lower frequency subset of the plural reference signal components to determine a subset of the geometric transform candidates for further refinement; and
in plural refinement stages, performing the transforming of coordinates, the measuring of correlation, the updating of coordinates and the determining of a new geometric transform on the subset of the geometric transform candidates.

7. The method of claim 2 further comprising:
measuring correlation between the transformed reference signal component and the image; and
executing instructions on one or more programmed processors to execute the acts of transforming coordinates, measuring, updating, determining the new geometric transform, and applying the new geometric transform.

8. The method of claim 2 further comprising:
measuring correlation between the transformed reference signal component and the image; and
performing the acts of transforming coordinates, measuring, updating, determining the new geometric transform, and applying the new geometric transform in special purpose digital logic circuitry.

9. The method of claim 1 further comprising:
executing instructions in the processor to pre-filter image content of the sub-block prior to obtaining the measure of signal confidence.

10. The method of claim 1 further comprising:
executing instructions in the processor to determine size of the sub-block adaptively based on correlations of plural different sizes of the sub-block.

11. The method of claim 1 further comprising:
executing instructions in the processor to cause the measure of signal confidence to trigger refinement of one or more of the geometric transform parameters.

12. A digital logic circuit for digital message extraction from digital data encoded in an image, the circuit comprising:
coordinate transform logic to determine a transform between coordinates of embedding locations and an image block of the image, the coordinate transform logic applying a geometric transform approximating a transformation between the embedding locations and the image block;
sampling logic for sampling the image block based on the transform;
correlation logic for determining correlation between samples of a sub-block of the image block and a reference signal, the correlation providing a signal confidence metric for the sub-block;
message estimate extraction logic for extracting message estimates from embedding locations in the sub-block;
weighting logic for applying the signal confidence metric as a weight for message estimates of the embedding locations in the sub-block, the signal confidence metric being computed as a sum of correlation components of the sub-block, and the signal confidence metric being normalized by dividing the sum of correlation components by energy of the sub-block; and
decoding logic for decoding message symbols from the weighted message estimates.

13. The digital logic circuit of claim 12 comprising logic configured to adapt size of the sub-block based on correlations of plural different sizes of the sub-block.

14. The digital logic circuit of claim 12 comprising logic configured to trigger refinement of one or more geometric transform parameters based on the signal confidence metric.

15. A non-transitory computer readable medium on which is stored instructions, which when executed by a processor, perform a method for digital message extraction from digital data encoded in an image, the instructions configured to:
obtain image samples from an image block and geometric transform parameters that approximate a geometric transform of embedding locations of the digital data encoded in the image samples of the image block;
obtain a measure of signal confidence of a reference signal in a sub-block of the image block where the geometric transform parameters are applied to provide a geometric transform between the embedding locations and the sub-block, the signal confidence being computed as a sum of correlation components of the sub-block, and the signal confidence being normalized by dividing the sum of correlation components by energy of the sub-block;
extract message estimates from embedding locations of the sub-block of the image block;
weight the message estimates by the normalized signal confidence of the sub-block from which the message estimates are extracted; and
decode a message from the weighted message estimates.

16. The non-transitory computer readable medium of claim 15 on which is stored instructions configured to:
transform an image into a frequency domain to produce a discrete frequency domain representation of the image at integer coordinates;
estimate phase at non-integer coordinates within the discrete frequency domain representation of the image according to a point spread function;

for plural reference signal components of the reference signal:

transform coordinates of a reference signal component according to a candidate geometric transform;

update the coordinates of the reference signal component to a location within a neighborhood of the discrete frequency domain representation around the coordinates of the transformed reference signal component, the location corresponding to a highest frequency magnitude value of frequency magnitude values within the neighborhood, wherein frequency magnitude values at non-integer locations in the neighborhood are computed using the phase estimated at non-integer locations;

determine a new geometric transform that transforms the reference signal components to the updated coordinates; and apply the new geometric transform to extract encoded digital data from the image.

17. The non-transitory computer readable medium of claim 16 wherein instructions to estimate phase at non-integer coordinates comprise instructions configured to estimate complex frequency components at the non-integer coordinates by applying weights obtained from the point spread function to neighboring complex frequency components at integer locations; and wherein the frequency magnitude values within the neighborhood are magnitude values of the complex frequency components in the neighborhood.

18. The non-transitory computer readable medium of claim 16 further comprising instructions configured to:

perform the transforming of coordinates and measuring of correlation with a lower frequency subset of the plural reference signal components to determine a subset of the geometric transform candidates to refine; and in plural refinement stages, perform the transforming of coordinates, the measuring of correlation, the updating of coordinates and the determining of a new geometric transform on the subset of the geometric transform candidates.

19. The non-transitory computer readable medium of claim 15 on which is stored instructions, which when executed by the processor, determine size of the sub-block adaptively based on correlations of plural different sizes of the sub-block.

20. The non-transitory computer readable medium of claim 15 on which is stored instructions, which when executed by the processor, trigger refinement of one or more of the geometric transform parameters based on the measure of signal confidence.

* * * * *